(12) United States Patent
Landresse

(10) Patent No.: US 6,351,744 B1
(45) Date of Patent: Feb. 26, 2002

(54) MULTI-PROCESSOR SYSTEM FOR DATABASE MANAGEMENT

(75) Inventor: P. J. Landresse, Capistrano Beach, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/322,535

(22) Filed: May 28, 1999

(51) Int. Cl.[7] .............................................. G06F 17/30
(52) U.S. Cl. ............................ 707/8; 707/1; 707/200; 707/10
(58) Field of Search .................. 707/200, 8, 1, 707/10; 709/103, 107; 714/11–12; 710/20, 33, 51–52

(56) References Cited

U.S. PATENT DOCUMENTS

| | | | | |
|---|---|---|---|---|
| 5,327,556 A | * | 7/1994 | Mohan et al. .................. | 707/8 |
| 5,369,757 A | * | 11/1994 | Spiro et al. .................... | 714/19 |
| 5,806,059 A | * | 9/1998 | Tsuchida et al. ............... | 707/2 |
| 5,940,827 A | * | 8/1999 | Hapner et al. ................. | 707/8 |
| 5,956,704 A | * | 9/1999 | Gautam et al. ................ | 707/1 |
| 6,088,705 A | * | 7/2000 | Lightstone et al. ......... | 707/200 |
| 6,101,504 A | * | 8/2000 | Gord .......................... | 707/201 |
| 6,189,069 B1 | * | 2/2001 | Parkes et al. ............... | 711/100 |

OTHER PUBLICATIONS

Lu et al., Dynamic and Load–Balanced Task–Oriented Database Query Processing in Parallel Systems, Department of Information Systems and Computer Science National University of Singapore, 1992, 257–372.*

* cited by examiner

Primary Examiner—John Breene
Assistant Examiner—Debbie M Le
(74) Attorney, Agent, or Firm—Alfred W. Kozak; Mark T. Starr; Lise A. Rode

(57) ABSTRACT

A multi processor system is interconnected through a memory means to multiple numbers of database engines on which there can operate multiple numbers of user programs in order to select buffers which have been modified so that the data in the buffers can be written or copied to a storage medium holding database file structures. The user programs operate in parallel so that multiple concurrent update operations can be continuously completed.

10 Claims, 14 Drawing Sheets

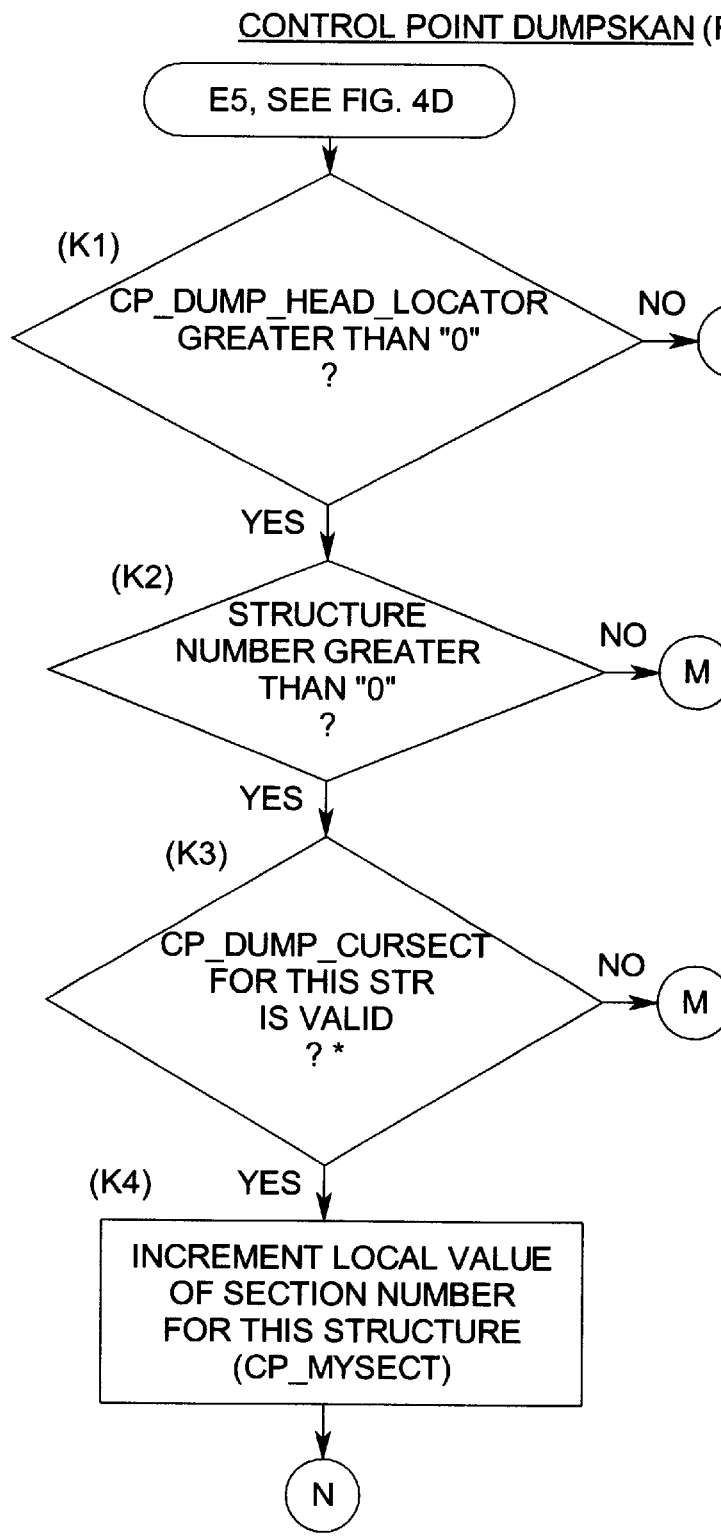
FIG. 4I1

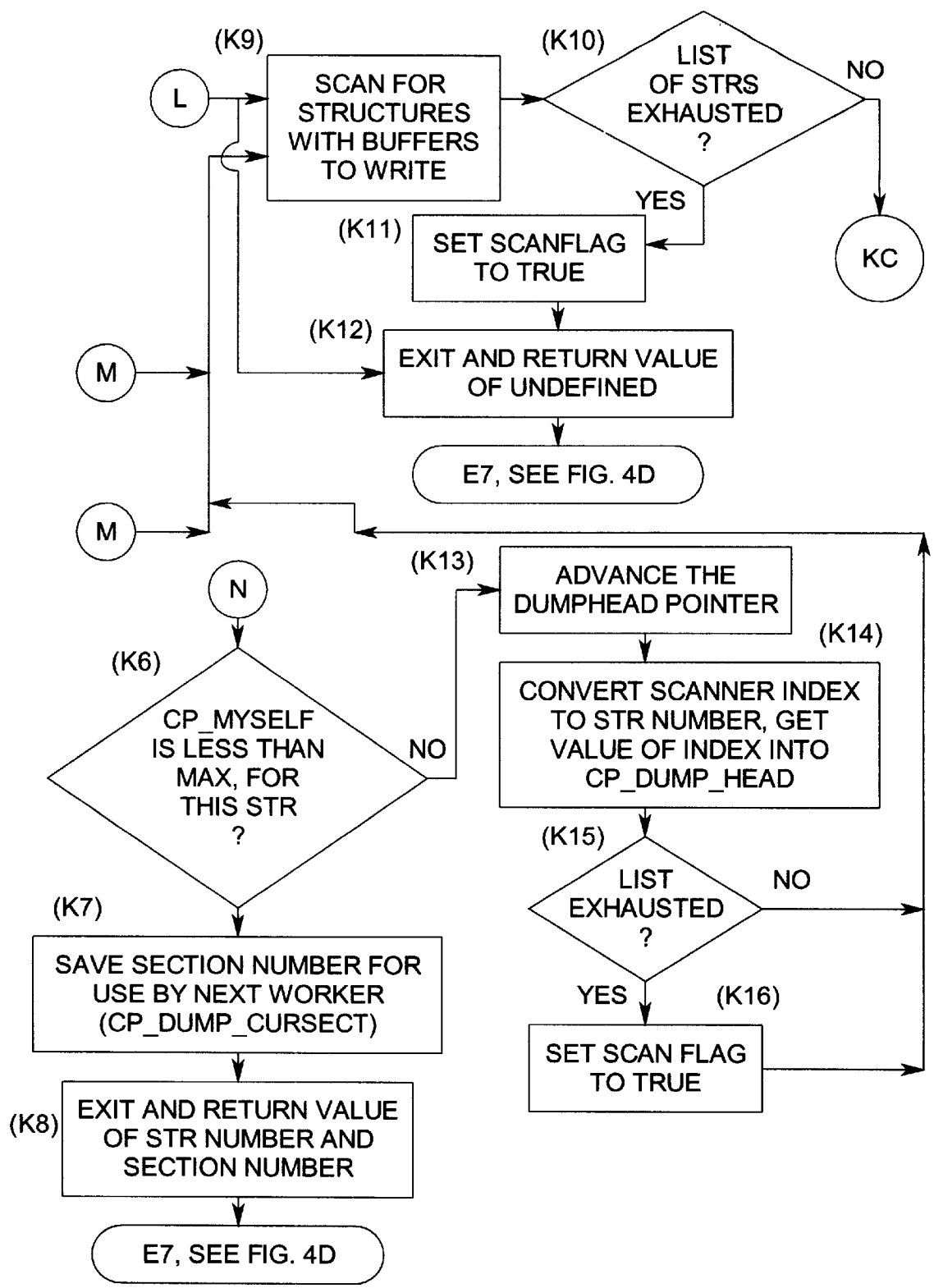
FIG. 4I2

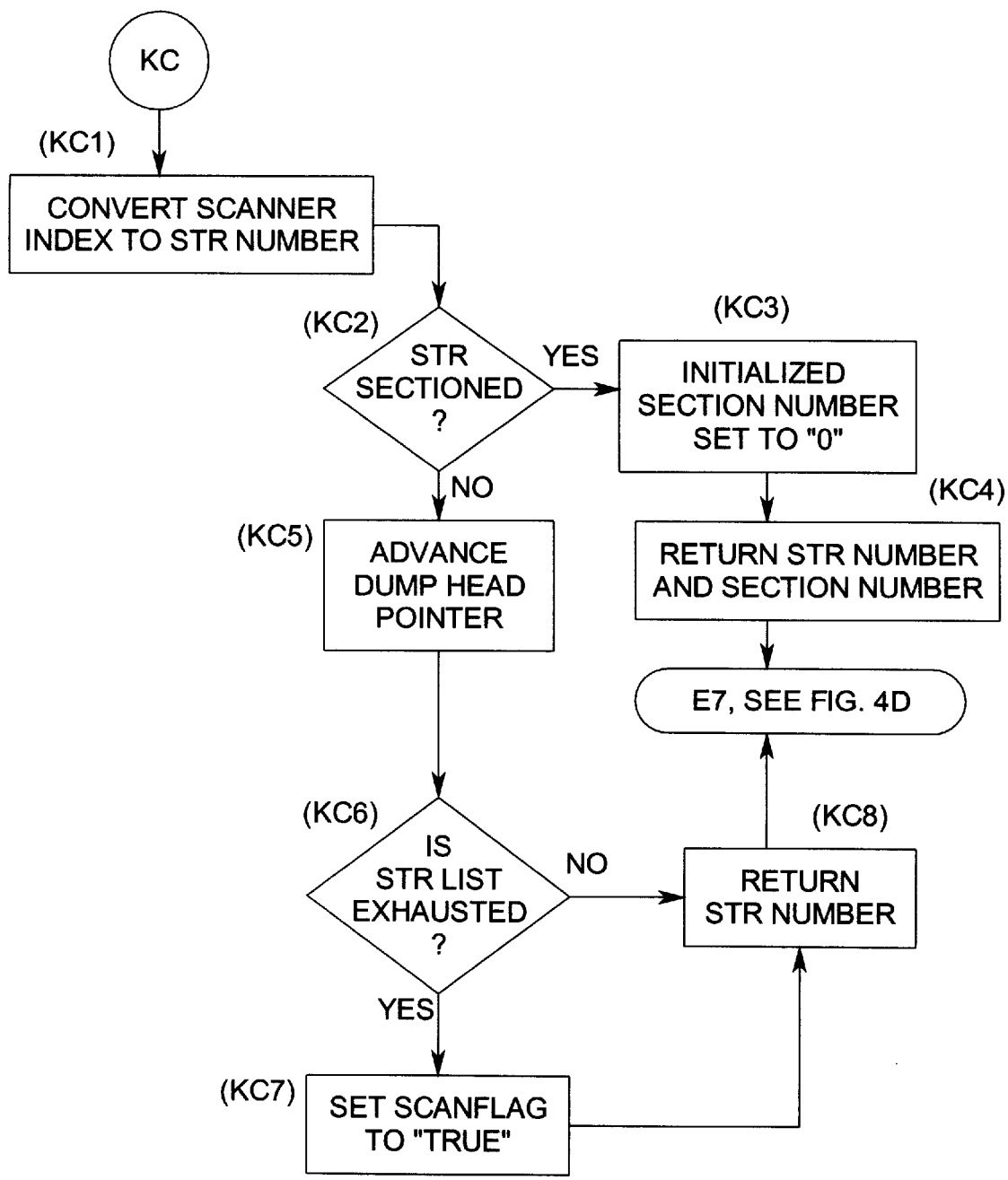
FIG. 4I3

MULTI-PROCESSOR SYSTEM FOR DATABASE MANAGEMENT

CROSS-REFERENCES TO RELATED APPLICATIONS

This application is related to a co-pending application, U.S. Ser. No. 09/322,535, entitled "High Speed Method for Flushing Data Buffers and Updating Database Structure Control Information" which is incorporated herein by reference.

FIELD OF THE INVENTION

This disclosure relates to systems of multi processors, which utilize a multi-programming environment to manage file structures in a database.

BACKGROUND OF THE INVENTION

It is recognized that modern computer and communication systems continuously utilize huge amounts of data. Often as a result of this, the data management and data storage operations have been seen to become significant technical issues. Multi-programming and multi-processing operations which are typical of complex systems have large data requirements which require the use of massive amounts of storage.

In such multi-processing and multi-programming type systems, the data is generally stored on a storage media, such as magnetic disk, as blocks of data. Subsequently, the data is often read from the storage media into a temporary memory such as a cache or buffer which might consist of Random Access Memory. After this, it can be accessed by user application programs. One of the chief problems involved has to do with the updating of the database structure control information and flushing the data buffers of stale information. It is desirable that each of these updates will occur utilizing the minimal or least amount of time by taking advantage of the computer systems ability to run asynchronous processes and to overlap the Input/Output operations.

The optimum situation for the taking place of Input/Output operations is that they take place while no user applications are actively accessing that particular data within the database. Copies of the data will exist both within the applications and within the database. This is done to maintain both physical and referential data integrity. It is quite consistently necessary to provide updates to the database's buffers, and rather than maintaining control as a single process, or initiating multiple new independent processes to perform the updates, it is possible to use local environments that can access shared data and be so used to take advantage of the user application infrastructures that are already present. These types of procedures can, in effect, run "on top" of the user programs.

Prior systems which flushed data buffers and updated the database structures operated on a relatively slow serial basis. This type of mechanism was responsible for determining which of the structures had data buffers to be flushed, then writing to the disk, then testing for Input/Output completion, then writing the control information, then restarting the other applications. Due to the fact that this was a serialized process, it was not only inefficient, but did not take advantage of the performance that is inherently possible in multi-processor technology.

The presently described system operates to eliminate the relatively slow serial process and provide a fast high-speed flushing of data buffers and operations for updating the database structure control information. The described system is completely asynchronous. Rather than simply waiting, the user tasks are utilized concurrently in time as workers and as such, user tasks participate in the process of independently writing the data buffers, then testing for I/O completions, and finally updating the structure control information.

In the presently-described system, various tasks may enter the process and engage at any particular phase or change roles at any time. These processes are "First-In, First-Out" (FIFO) in nature. As an example, the task initiating the WRITES for a given set of data buffers is not necessarily the task that assures their completion.

Further, coordination is achieved by selecting a single process to perform only those housekeeping functions that absolutely require serialization. The use of shared data is limited only to those instances where it is required to drive the process forward. Asynchrony is further assured by only restricting access, via a software data lock, to those instances where the shared variables require alteration. This mechanism limits serialization to the absolute minimum necessary to ensure integrity. The previously used systems and methods for a given database configuration, did not significantly benefit from an increase in performance beyond that which could be afforded only by the addition of a second processor. Thus, the operations did not appropriately scale in proportion to the number of processors added. However, the presently described system has the advantage of being about 30% faster for two and three processor configurations, and of continuing to provide increased throughput even as the workload increases and additional processors are added.

SUMMARY OF THE INVENTION

A plurality of processors and database engines are interrelated through a memory system to provide an asynchronous mechanism for distributing the operating workload of flushing data buffers over a multiple number (N) of worker tasks. A multiple number of database engines having access routines available to multiple numbers of user application programs are connected to different sets of data file structures in databases composed of multiple physical files. The system provides a considerable advantage by making use of the user tasks already running on multiple processors (CPUs) so that the time required to accomplish any particular one of the given tasks is minimized in several specialized ways.

Initially, all of the Write operations to various buffer units of a buffer pool are initiated concurrently which would indicate that there is a high probability that the first initiated set of Write operations will be finished even before the initiation of the last set of Write operations. Subsequently then in a similar fashion, there is the requisite testing for the correct completion of each of the I/O operations which is handled. Thus, by using the same orderly sequence as was done in initiation of the Write sequence, then the majority, if not all, of the Write operations will have been completed by the time the completion information has been examined to verify the proper Input/Output transfer to the database file structures. As a result, the probability of having to wait for any one particular operation to be completed, is extremely low.

Secondly, the operating workload for completing the various tasks is spread across the active update users of the database. This enables the multi-processor system to take advantage of its ability to perform and operate upon multiple tasks simultaneously. Another advantage is that the use of the existing application tasks does not burden the system with the overhead of initiation and the management of specialized tasks which might otherwise be required to perform these functions. The system takes full advantage of the parallelism inherent in multi-processor systems.

BRIEF DESCRIPTION OF THE DRAWINGS

FIG. 4I1, 4I2 and 4I3 show the flow chart sequence of CONTROLPOINTDUMPSKAN.

GLOSSARY OF TERMS

Figure 1:
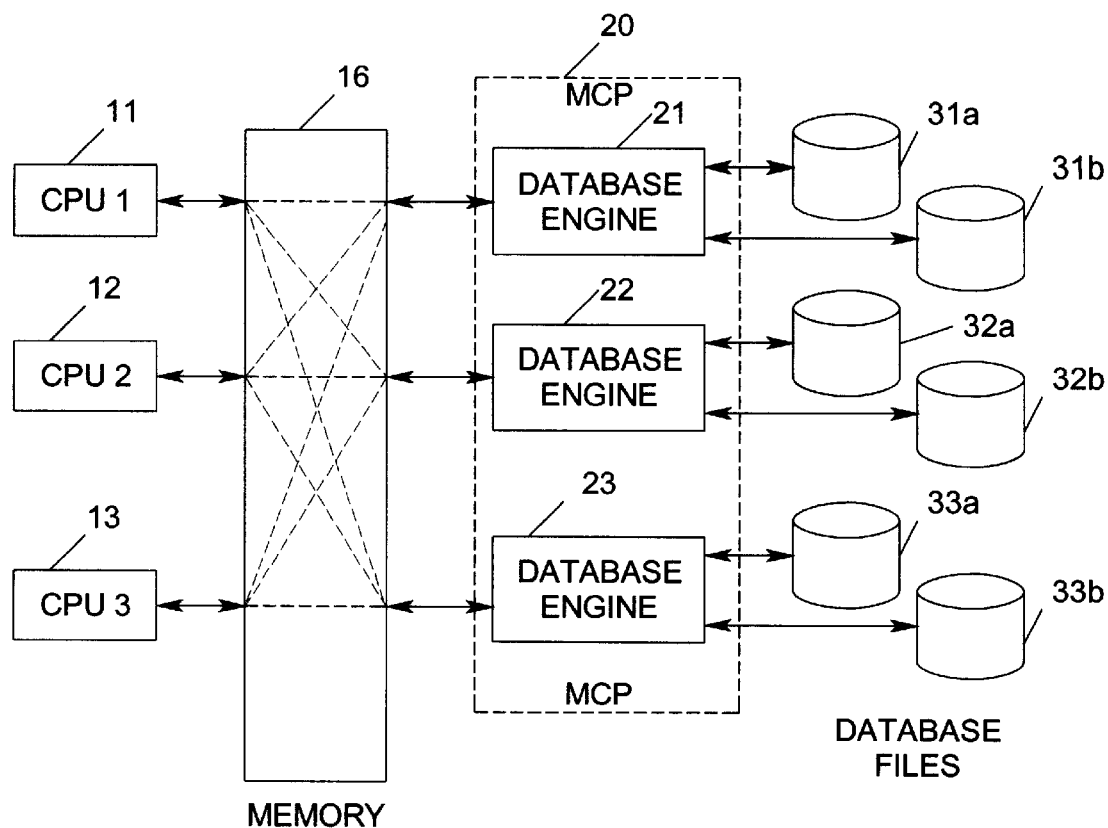
FIG. 1 is a drawing of a multi-processor/multi-program operating system which provides management services such as access coordination and I/O handling between data structures in memory and file data located on a series of storage media.

ALL DUMPBUFFERS: An array used to hold descriptors to the DUMPBUFFERS procedures for the various data structures. It is filled in each time the database runs. This technique is used to permit the calling of certain data structure functions from areas that would not normally have visibility to them due to the rules of scope as defined for lex Levels. This feature is not accessible by user application programs and does not compromise security in any way. See also DUMPBUFFERS ASYNCHRONOUS PROCESS: A process or procedure that can execute independently of its parent or siblings.

AUDITCONTROLPOINT: This procedure is the router for the work that must be accomplished to successfully complete a Control Point. Many of its functions are of a housekeeping nature.

BLOCK:
  (1) A group of physically adjacent records that can be transferred to or from a physical device as a group.
  (2) A program, or a part of a program, that is treated by compilers as a discrete unit. Examples are a procedure in ALGOL, a procedure or function in Pascal, a subroutine or function in FORTRAN, or a complete COBOL program.

BUILDCONTROLPOINTDUMPLIST: This procedure scans one of the parallel arrays in the DCB (DCBCONTROLWORDS) looking for a particular bit that indicates whether the buffer has been modified and must be flushed during the Control Point. When a buffer index is found, it is placed into the CP_DUMP_HEAD location that corresponds to its structure number and the previous entry is moved into CP_DUMP_LIST.

COMMONDBS: A set of procedures and defines that are included into all structure types that can be declared for a database. By utilizing certain capabilities of the compiler they become tailored (for the particular structure type) by the compiler during the compilation process. This technique results in very efficient runtime execution as many of the decisions and steps that would normally be required during execution have been eliminated.

CONTROL(ING) STACK: A term used to identify the stack that actually initiates and finishes the work necessary to perform a Control Point.

CONTROLPOINT: In Data Management System II (DMSII), a feature that limits the amount of audit information scanned by halt/load and Abort recovery. The CONTROLPOINT is performed when the last process leaves the transaction state.

CONTROLPOINTDUMP: Prior to implementation of this invention, this procedure centralized control (non-distributive) of the process for data and storage control buffers during a Control Point.

CONTROLPTDUMPSKAN: Scans CP_DUMP_HEAD and returns the structure and section numbers for structures having buffers that must be flushed during the Control Point.

CP_DUMP_CURSECT: Used in CP_DUMPBUFFS and CPGETALLSTRNUMS to supply the current section number to the next worker task that wants to perform buffer work during a control point. It is indexed by structure number.

CP_DUMP_HEAD: Head of the list (by structure) of DCBs to be written during the control point. It is indexed by structure number.

CP_DUMP_HEAD_LOCATOR: An index into CP_DUMP_HEAD that is used to indicate when the list represented by CP_DUMP_HEAD has been exhausted.

CP_DUMP_LIST: The list of DCBS to be written during the control point. Indexed by DCB. CP_DUMP_HEAD is the beginning of this list.

CP_DUMP_SECTINFO: The maximum number of sections that have been declared for a structure. Used in conjunction with CP_DUMP_CURSECT. Indexed by structure number.

CP_DUMPBUFFS: Coordinates the retrieval of structure and section numbers from CP_DUMP_LIST and calls the DUMPBUFFERS procedure for the associated structure. This is the key procedure for assuring that all of the Control Point buffer write activity occurs in parallel.

CP_MYSTR: The value of a structure number extracted from a DCB (Data Control Block). It is used by the process described by this document to call ALL_DUMPBUFFERS for a particular data structure during control point activity.

CP_SOC_BUF: The name given to a set of buffers used for reading and writing a data structure's storage control information. Prior to this invention a single buffer was used for any given database. Now, there is a buffer for each data structure. This permits storage control I/O operations to occur in parallel for multiple data structures.

CP_STEP: Used to synchronize the control point process. It prevents the asynchronous process from performing the same housekeeping tasks more than once. One of its values also signifies that the buffer activities associated with control points have been completed.

CP_STRSTOPROCESS: The sum of the number structures and sections to be processed at control point time.

CP_TOTAL_SECTS: The total number of sections for all data structures.

CP_WORKERCOUNT: The count of the number of control point workers.

CPGETALLSTRNUMS: Returns values of all possible structure and section numbers for the database. These are used for updating storage control information.

CPINPROGRESS: A Boolean that indicates that the buffer writing phase of Control Point activity is in progress. One of its uses is to prevent applications just entering database code from attempting to perform updates.

CPT_LOCK (Control Point Lock): A software lock used to synchronize changes to variables that can be seen by all of the stacks participating in the Control Point process. It prevents such things as double counting and having multiple stacks attempting to write buffers that belong to the same structure and, or, skipping a structure.

CTLSTACK: All stacks calling CP_DUMPBUFFS include a single Boolean parameter. Within CP_DUMPBUFFS it is known as CTLSTACK and indicates whether the caller is a "worker" or the stack that has overall responsibility for the Control Point process. Only one task is allowed to control the process; this is the stack that triggered the control point (i.e. the last one out of transaction state when the count of transactions had reached a user specified value).

D2, D3 . . . DN: See lexical level.

DATABASE ENGINE: A general term for the software that manages the access to and activity within database files.

DATABASE PROGRAM: A software application that allows for the storage and retrieval of information which is structured as fields, records and files. Often called DBMS, Database Management System.

DATABASE STRUCTURES: DMSII structures are the building blocks of every DMSII database. All structures are files of type DBDATA. The structures are made up of common file components: records and fields. Each structure can be standard or it can have one or more special characteristics that governs either the type of data the database stores or the way applications can access the data.

DMSII: A data management system provided for Unisys Corporation computer systems. This is software that allows a User to manage multiple data files. An overview of this system is detailed in Unisys Publication Part 8807 6625-000, dated September 1997 and is entitled "Getting Started with DMSIII".

DCB (DATA CONTROL BLOCK): A Data Control Block represents control information that pertains to a particular buffer. In order to utilize system memory efficiently, Data Control Blocks are implemented as a series of parallel arrays. Each of these arrays is unique in that it contains information of a particular type (e.g. the I/O results for all buffers are contained in an array called IORESULTS). A DCB is a variable that represents one word out of each of these arrays: DCB "n" thus consists of USERCOUNTS [n], BUFFDESCS [n], IORESULTS [n], etc. Active DBC's are organized in 1 to 1 correspondence with active buffers.

DCB NUMBER: The index value of a particular DCB.

DCBCONTROLWORD: A define that indexes into DCB-CONTROLWORDS for a particular DCB number: DCBCONTROLWORDS[DCB].

DCBCONTROLWORDS: One of the parallel arrays that make up the DCB. It contains some of the physical information related to the buffers.

DMSCAUSE: The DMSCAUSE statement is used for deadlock detection within DMSII functions. This statement calls the operating system procedure DMSCAUSE and passes a single parameter. The effect of the statement is dependent on the value of the parameter.

Value<0: Indicates that the calling stack has left transaction state. The program is delinked from the transaction state linkage chain.

Value=0: Indicates that a syncpoint or controlpoint has been completed. All programs (stacks) waiting for this action are resumed.

Value>0: Indicates that a record for which other users are waiting has been freed. The value of the parameter is the stack number of the previous owner of the record. All programs waiting on that stack number are resumed.

This DMSCAUSE restricted to use only by the Access-routines (database engine).

DMSII: Data Management System II. The trademarked name of the database management system used with certain models of Unisys mainframe computers.

DUMPBUFFERS: This procedure is used to control the actual writing and I/O completion testing for data and storage control buffers. A parameter determines which action(s) to perform.

EXTENDED EDITION (XE): An enhanced version of DMSII that introduced the concept of Sectioned data structures.

FIELDS: A field is a consecutive group of bits or bytes within a component of a record that represents a logical piece of data. A field (or column) is defined by the description of the data item it is to hold. As a point of information, sometimes in ordinary conversation, the name of the field is identified by the name of the data item. For example, for a data item named NAME, the field in the record can also be called NAME.

FLUSH(ING): This term is typically used in conjunction with buffers and indicates that they have been written to disk. The space occupied by whatever has been "flushed" may or may not become available for other uses.

HELPER STACK: A stack that assists with rapid completion of a control point by performing data and storage control writes operations.

I/O: Input/Output. An operation in which the system reads data from or writes data to a file on a peripheral device such as a disk drive.

I/O COMPLETION: An Input or Output (read or write) operation has completed. This is not an indication of success or failure; but simply that the action is no longer "in progress".

LEX LEVEL: See lexical level.

LEXICAL LEVEL (LEX LEVEL):
(1) A number that indicates the relative level of an addressing space within the stack of an executing program. Lexical levels range from 0 through either 15 or 31, depending on the computer family. A lower lexical level indicates a more global addressing space.
(2) A measure of the number of other blocks a block is nested within. The outer block of a program has a lex level of 2 or 3, depending on whether the program has a procedure heading. Each block has a lex level one higher than the block it is nested within.

LEXICOGRAPHICAL: Pertaining to a collation scheme used to order the true objects.

MCP: Master Control Program. The trademarked name of the proprietary operating system used with certain models of Unisys mainframe computers.

MODIFIED: Whenever a data record is changed, the data block in which it resides is considered to be "modified".

OP WORD: A general term for a parameter that signals which Operations will be performed by a task or procedure.

PARALLEL ARRAY: A series of arrays that share a common indexing scheme. A column, indexed by "n", represents an aggregate of information about some object. A Data Control Block is an example of this.

PROCESS STACK: A memory structure that stores information about the current state of the execution of a procedure. The process stack includes activation records for all blocks that the process has entered and not yet exited. Synonym for stack.

PROCESS STATE: The current status of a process. The three process states are scheduled, active, or suspended.

PROCESS SWITCHING: An event that occurs when the operating system tells the central processing unit (CPU) to execute a different program. Also called Task Switching.

PROCESS:
(1) The execution of a program or of a procedure that was initiated. The process has its own process stack and process information block (PIB). It also has a code segment dictionary, which can be shared with other processes that are executions of the same program or procedure.
(2) A software application; that is, any activity or systematic sequence of operations that produces a specified result.

RECORDS: A record is a group of logically related data items in a file. Sometimes a record is called a row. The data items reside in fields in the records. Sometimes a field is called a column.

REFERENTIAL INTEGRITY: A method by which data consistency is maintained in a database.

SCREEN DESIGN FACILITY (SDF): A Unisys application software product used for designing and managing forms that are displayed on a terminal (computer screen).

SCREEN DESIGN FACILITY PLUS (SDF PLUS): An enhanced version of (SDF).

SECTION NUMBER: The internal number assigned to each member (section) of a sectioned data structure. Section numbers are unique only within the scope of their logical data structure. For example, within a given database a structure named EMPLOYEE could have a section numbered as 2 and another data structure named PRODUCTS could also have a section numbered as 2.

SECTION(ED, ING): Sectioning is a technique of mapping the logical concept of a data structure onto multiple physical files (sections). This technique allows a logical file to exceed size limitations that may be imposed by any single physical file. It is also useful for organizing data into groupings.

SECTION_SB: This is a set of procedures used when dealing with the physical sections of a sectioned data structure. It utilizes a method of compilation that allows it to be called as though the software was indexing into an array. For example: SECTION_SB [section-number].STROPENSTRUCTURE would call the STROPENSTRUCTURE procedure for the section denoted by section-number.

SERIALIZATION: See Single Threaded.

SINGLE THREADED: Only one action can occur at a time; e.g. "A" then "B" then "C". Each of these actions much be complete before the next can be initiated.

STACK: A set of sequential locations in memory assigned to a task for the duration of its execution. These locations serve as temporary storage for variables, descriptors, and information pertaining to task processing. Synonym for process stack.

STORAGEOPENCLOSE: This procedure is called as part of the open and close activities for any given data structure. It is used for retrieval and update of the control information associated with data structures. It is also called on to perform the same functions during control points. STORAGEOPENCLOSE is one of the components of COMMONDBS.

STROPENSTRUCTURE: Every structure in the database has an STROPENSTRUCTURE. It is tailored at compile time and handles all of the work necessary to prepare to physically open a file. An example would be setting the file name and blocking parameters. In addition, administrative details used by and for storage control are gathered.

STRUCTURE NUMBER: Structure is a term that is analogous to file. Each file that is directly managed by the DMSII database management system is assigned a number that is internal to the database management system.

TASK: (1) A dependent process. (2) Any process, whether dependent or independent. (3) A single, complete unit of work performed by the system, such as compiling or executing a program, or copying a file from one disk to another. Tasks are initiated by a job, by another task, or directly by a user. See also process.

TRANSACTION STATE: In Data Management System II (DMSII), the period in a user-language program between a begin transaction operation and an end transaction operation. For audited databases, DMSII software allows an application program to logically group update operations and to process the group as a single transaction. The start of the group transaction is signaled by a begin transaction operation. The end of the group transaction is identified by an end transaction operation. While the program is in a begin and end transaction operation, the program and the database are in transaction state.

TRANSACTION: (1) The transfer of one message from a terminal or host program to a receiving host program, the processing carried out by the receiving host program, and the return of an answer to the sender. (2) (X/Open), a complete unit of work. It can comprise many computational tasks, data retrieval, and communication. A typical transaction modifies shared resources. (3) In data management, a sequence of operations grouped by a user program because the operations constitute a single logical change to the database. (4) In the Screen Design Facility Plus (SDF Plus), the structure that performs the transfer of the message.

UNDEFINED: A term used to represent a data value of all bits on.

WORKER STACK: See also Helper Stack.

General Overview

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure's attributes changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scaleability by growing or shrinking the database according to the ongoing needs at the time.

The DMSII provides standard software files that perform services and operations for all the databases connected to the system's Enterprise Server.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file(s).

In regard to access, an application user will access the data in order to (i) make an inquiry to get a Read of data in the database, or (ii) to update by doing a Read then a Write (or just a Write) to the database thus, adding, deleting or changing data. The "access" for either purpose contributes to an operation on the database which is called a "transaction".

A transaction is a sequence of operations grouped by a user program because the operations constitute a single logical change to the database, At the end and finality of the transaction point, the transaction is complete and without error, and it is considered as being "committed" to the database.

Actual real world data goes into special logical structures that are used by the Data Management System to store data. The database is designed to map categories of data into suitable structures. For example, the real world data would have a characteristic called a field within a structure called a "data set". An example of this would be a particular person's name within a "data set" describing persons. Then, real world data that can serve as an index of a whole data set has a structured name called a "set". This, for example, might be the social security number of any employee. Then there is data that can serve as an index to portions of a data set under a certain condition, and this is called a "subset". This might be an employee's work number, for example. Then, there is data about each instance of a particular category and the structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs and an application program can then understand how to make this data accessible for various inquiries and/or changes. This is done with the Data and Structure Definition Language (DASDL).

The Data Management System structures are the building blocks of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name which defines a unit of information about a category in a given field (column) of a data set record. The, the "global data item" serves the purpose of storing a unit of information about the entire database or any of its involved structures. In general discussion about the types of data and the names of data structures, it is often seen that in a relational database, a "data set" is called a "table". A "set" or "subset" is frequently called an "index". A "data item" is often called a "field" or a "column", or is often called by its data name. For example, a project number. The "structures" are made of common file components designated as records and fields.

A record is a group of logically-related data items in a file. Often, a record is called a "row". Data items reside in different fields in the records. For example, a record might involve a series of data such as an employee's name, the employee's I.D., the employee's social security number and years of employment, for example. A group of such records would constitute a "file".

The operating system which uses the data management system will treat the "record" as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file. As part of the physical actions of performing these operations, the records are grouped into larger units called "blocks" for performing the actual Reads and Writes. This is done on the theory, and the practicalities, that more than one application is likely to want records from the same area of the file. It is more efficient to perform one large physical Read or Write to transfer data than it is to perform several smaller ones. Thus, many records can be obtained from memory while only requiring a single transfer to or from the hardware on which it is stored.

A "field" is a consecutive group of bits or bytes within a particular component of a record which will represent a logical piece of data. A "field" or "column" is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, 1, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity --- type, size, location, and attributes --- of one element of data for a database entity. When an application submits an update to a data item, the Data Management System will accept the update if it corresponds to the definition of a data item. Otherwise, the change is rejected and reported as an exception. The Database Administrator will add, delete or change the data item definitions. There are a number of data item types that are used by the Data Management System. These include the type called "alphanumeric" which include words and characters, which are used to make up things like names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items which are called "Boolean" which involve TRUE and FALSE values.

The "global data item" is a data item, a group item, or a population item that is not part of any data set but still pertains to the database as a whole. Such global data items are stored in one special record called the "global data set record" in the DASDL declaration which is outside the other structure definitions. Sometimes the global record is placed just before the structured definitions in the DASDL file. The global data item has the purpose of holding permanent information about the database as a whole or about a particular data set. It also acts as a place holder for information that can be derived from the database.

One of the most significant options in DASDL is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

The audit trail is a log of changes made to the database. This type of audit trail is somewhat similar to the SUMLOG for the host system which is history of all system activity except for the fact that the audit trail will record the database update activity only and will consist of separate numbered files. Thus the data management system software can use an audit trail to recover the database from an unusable state, provide restart information to user programs, reconstruct portions of the database that had been lost because of hardware errors, back out aborted transactions and roll back the entire database to a user specified point or rebuild the entire database to a user-specified point.

The "audit file" provides a chronological history of all update database transactions. The audit file is a numbered segment of the database audit trail where the data management system assigns each audit file to have an audit file number (AFN) in the range of 1 to 9999.

Accessroutines Program: The data management system controls access to database data with a software program called the Accessroutines which is a collection of specialized routines that enables many users to access the database at the same time and ensures that the access is controlled so that accesses do not conflict with one another.

Control File: Each active data management system database has a control file. The control file contains the time stamps for the database software and files and the Accessroutines since the Accessroutines use time stamps to check the validity of data. A control file also contains the update levels of the database and the structures since the Accessroutines use update levels to check the validity of data. Further, the control file functions to store audit control information, dynamic database parameters plus other information. It further guards the database from interruption while a process that needs exclusive access to the database goes on to complete its task successfully, such as, for example, a halt/load recovery and/or a reorganization. The control file assures that a database that has been interrupted for any reason is not accessed until the integrity of the database is further guaranteed by the successful completion of the recovery process.

I/O Operation: An I/O (input output) operation is one in which the system reads data from or writes data to a file on a peripheral device, such as a disk drive. when there is a failure of a read or a write operation, then this is considered to be a I/O error, which must be handled.

Backup: The most important preventive maintenance task which can be performed for a database is to back up the database frequently and to keep the backups for some period of time. To back up the database means to use the data management system DMUTILITY program to make a copy of all or part of the database. This backup will include a check of the physical integrity of all the database's structures being backed up. A complete database includes providing a reserve copy of all the files pertaining to the database. All the files include not only the database files and the control files (which may change from time to time) but also the DASDL source file, the description file, various tailored files, application programs, and audit files. This enables a user to put the database back in operation quickly in case the current database files should become unavailable or damaged.

Here there is involved the concept of "dump." A dump involves either a copy of stored data in which a change has been made since the previous dump of that data or a transfer of all or part of the contents of one section of computer storage to another section or to some other output device. The processes used to make a database are called "backing up" and "dumping." A backup to tape is called a "tape dump" while a backup to disk is called a "disk dump."

Often the backing up operation for the database is done by increments. An increment is one of the series regular consecutive additions, for example if a database is too large to back up on a daily basis, the operator could create a schedule that backed up a certain number of database files (an increment) each day until the entire database was backed up.

The dump of a database is done to tape or disk depending on what type of storage resources are available. Tapes are most frequently used since they are the less expensive resource than disk. When dumping is done to tape, it is necessary to furnish information common to any disk-to-tape process and this information would include the tape name, the cycle number, the version number, workers, the serial number, compression and non-compression, the density, and the SCRATCHPOOL option.

However, when dumping to disk it is only necessary to specify the file title for the entire dump and the number of dump files into which the system should place the dump.

Recovering a database means to get it back and ready up to date, ready for access with complete and correct data. The recovery of the database can be done either automatically or be done manually using various software utilities and commands.

DESCRIPTION OF PREFERRED EMBODIMENT

As was previously discussed, earlier systems used a serial or sequential step-by-step process for determining which structures had data buffers to flush, after which there was a writing of the buffers and then testing for Input/Output completion, then writing the control information and then re-starting other applications. This type of "serialized process" was rather inefficient and did not take advantage of the performance available inherently in multi-processor technology.

The present system is completely asynchronous and rather than waiting for serial tasks to be concatenated in sequence, the present system allows the user tasks to be concurrently utilized as "workers" and to participate in the process of independently writing data buffers, testing for their I/O completions, and updating the structure control information in the database files.

Now referring to FIG. 1, there is seen a multi-processor system indicating, for example, three central processing units, designated 11, 12 and 13, which are all connected to a common memory system 16.

Then, working through the memory system, it is seen that the first processor 11 is connected to the database engines 21, 22, 23 which reside in the Master Control Program 20. The database engine 21 then communicates back and forth to the data file structures indicated therein as 31a and 31b.

Likewise, the processor 12 communicates through the common memory 16 to the database engines 22, 21, 23 which then intercommunicates with the data file structures 32a and 32b.

The processor 13 communicates through the common memory to the database engines 23, 21, 22 of the Master Control Program and the database engine 23 then interconnects and intercommunicates with the database files 33a and 33b.

Figure 2:
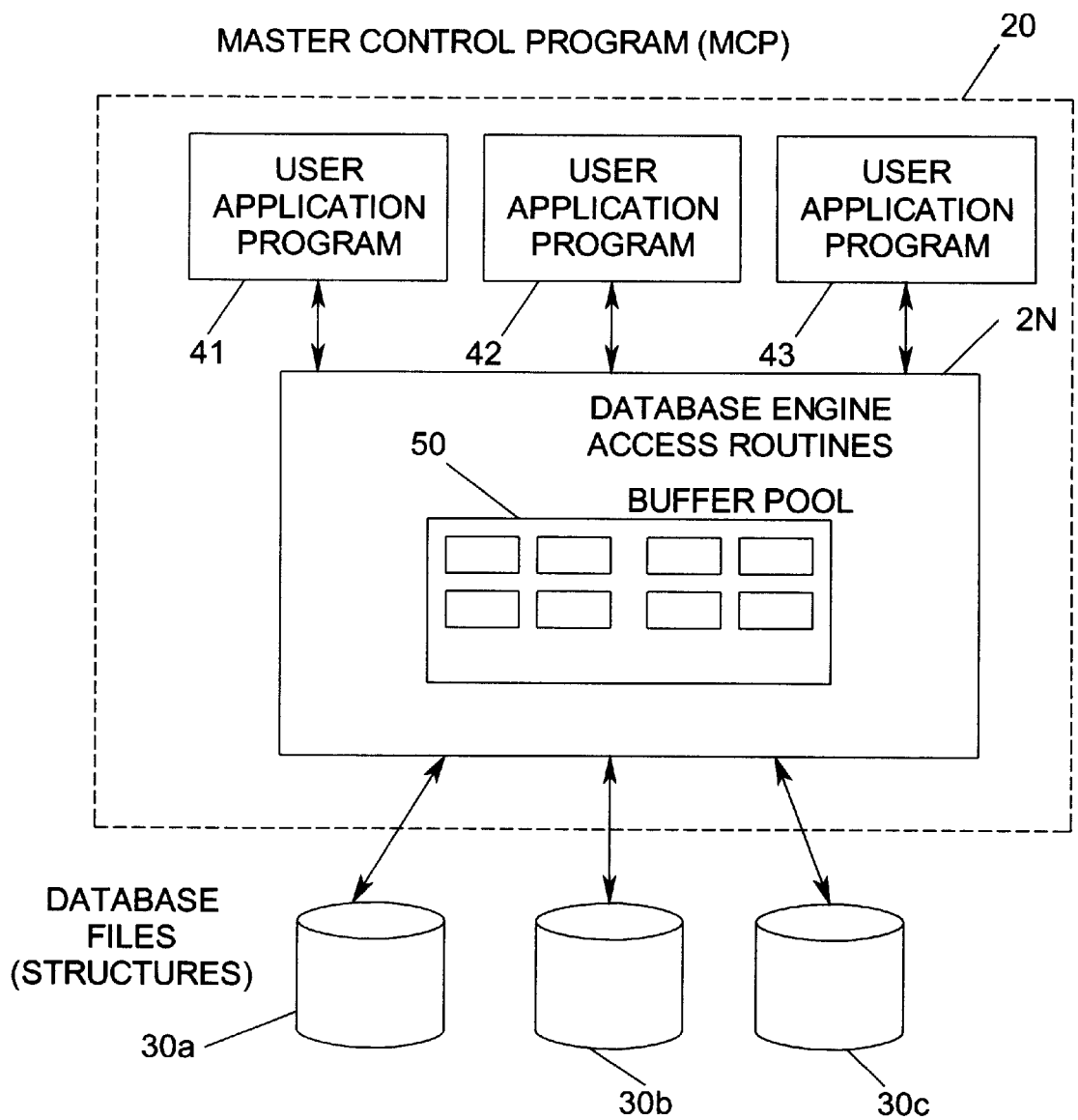
FIG. 2 is a more detailed diagram of the database engine and its operation with different user application programs.

Referring to FIG. 2, there is seen the Master Control Program 20 (MCP) which interacts with, and controls, a number of individual units some of which are shown herein as the database engine 2N which interconnects with various user-application programs shown as 41, 42, and 43.

The database engine actually includes a set of access and control routines which enable communication between the user application programs and the database engine, and also from there to a set of the database file structures indicated as 30a, 30b and 30c.

The database engine 2N is seen having a buffer pool 50 where multiple buffer units are available for the uses of the various user application programs and which can be used to copy data from specialized chosen buffers into specialized records on the database file structures.

The present system can be elucidated by the Unisys Corporation Data Management System II (DMS II), which is described in Unisys Corporation Document No. 8807 6625-000, and dated September 1997, as published by the Unisys Corporation Publications Division in Plymouth, Mich.

The following description is based on the items which have been defined in the previously-listed Glossary items which define the various concepts and software programs which are involved.

The procedure CONTROLPOINTDUMP had been used to both initiate and monitor completion of all control point Input/Output (I/O) activity. This mechanism was designed to run entirely on the stack of the last User program to leave the transaction state. As was previously indicated, the earlier control point mechanism actually created a bottleneck because it was "single-threaded", while the present system operates on a parallel operating basis which can be considered "multiple-threaded". The CONTROLPOINT, as used in the Data Management System of Unisys, is a feature that limits the amount of audit information that must be scanned by Halt/Load and the Abort/Recovery processes when recovering the database. The CONTROLPOINT is performed when the last user task leaves the transaction state, given that the requisite number of transactions have occurred or that other specialized activities are about to take place. The "transaction state" is the period in a user-language program, which occurs between a "Begin" transaction operation and an "End" transaction operation. For all audited databases, the DMS II software allows an application program to logically group the update operations and to process this group as a single transaction. The start of the group transaction is signaled by a "Begin" transaction operation. The end of the group transaction is identified by a "End" transaction operation. However, while the program is between the Begin and the End transaction operation, the program and the database are considered to be in the "transaction state".

A "transaction" involves one or more of the following: (i) the transfer of one message from a terminal or a host program to a receiving host program, where the processing is carried out by the receiving host program and the return of an answer to the sender; and (ii) a complete unit of work (X/Open). This can comprise many computational tasks involving data retrieval and communication. A typical transaction modifies the shared resources; (iii) In data management, a sequence of operations grouped by a user program because the operations constitute a single logical change to the database. (iv) In the Screen Design Facility Plus (SDF Plus), it is the structure that performs the transfer of the message.

The efficiency and capabilities have been greatly improved by the present system because the CONTROLPOINT mechanism has been designed to take full advantage of the inherent capabilities of both multi-programming and multi-processing environments.

Figure 3:
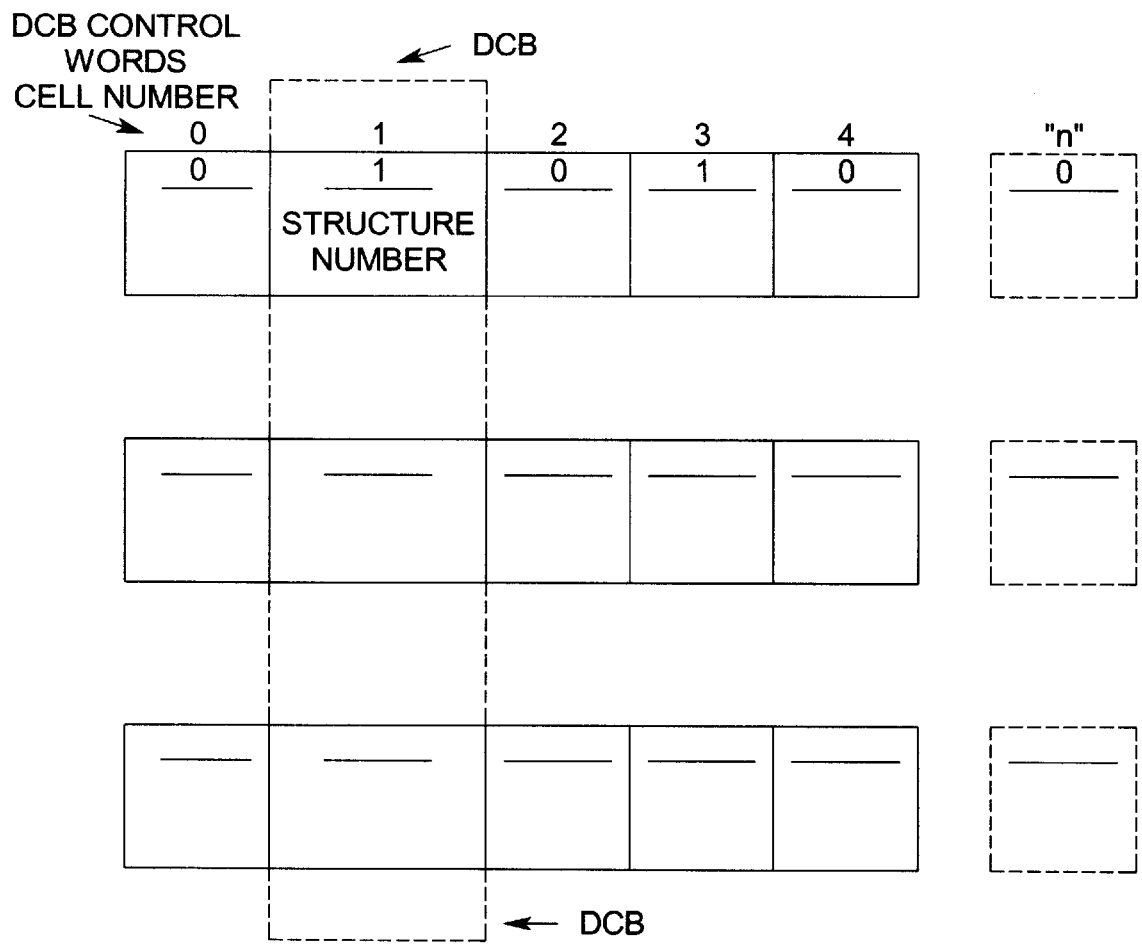
FIG. 3 is a schematic drawing illustrating the data control block control words which are shown in parallel arrays and which form cell numbers forming a set of data control block units for each cell number.

FIG. 3 is an illustration of a set of parallel arrays used for Data Control Block control words. A Data Control Block represents control information that pertains to a particular buffer. In order to utilize the system memory efficiently, Data Control Blocks are implemented as a series of parallel arrays, as seen in FIG. 3. Each of these arrays is unique, in that it contains information of a particular type, for example, the Input/Output (I/O) results for all buffers are contained in an array called IORESULTS. A Data Control Block (DCB) is a variable (data item) that represents one word out of each of these parallel arrays: DCB "N" thus consists of USER-COUNTS (N), plus BUFFDESCS (N), IORESULTS (N), and so on. Active Data Control Blocks are organized in one-to-one correspondence with active buffers.

As seen in FIG. 3, a particular DCB has a DCB number or "cell number" which is the index value of that particular DCB. Thus, the DCB at cell number 1 is seen to encompass three areas of the parallel arrays, and it is seen that the number "1" inside the upper half of the upper array indicates that a modification has taken place, while the lower part of the upper half gives the structure number. Here, the structure is a term that is analogous to a file. Each file that is directly managed by the DMS II Database Management System is assigned a number that is internal to the Database Management System. Note that the "three" illustrated arrays in FIG. 3 is for illustrative purposes only and that a Data Control Block, DCB is comprised of a larger number of parallel arrays and, further, that number does increase from time to time.

Figure 4A:
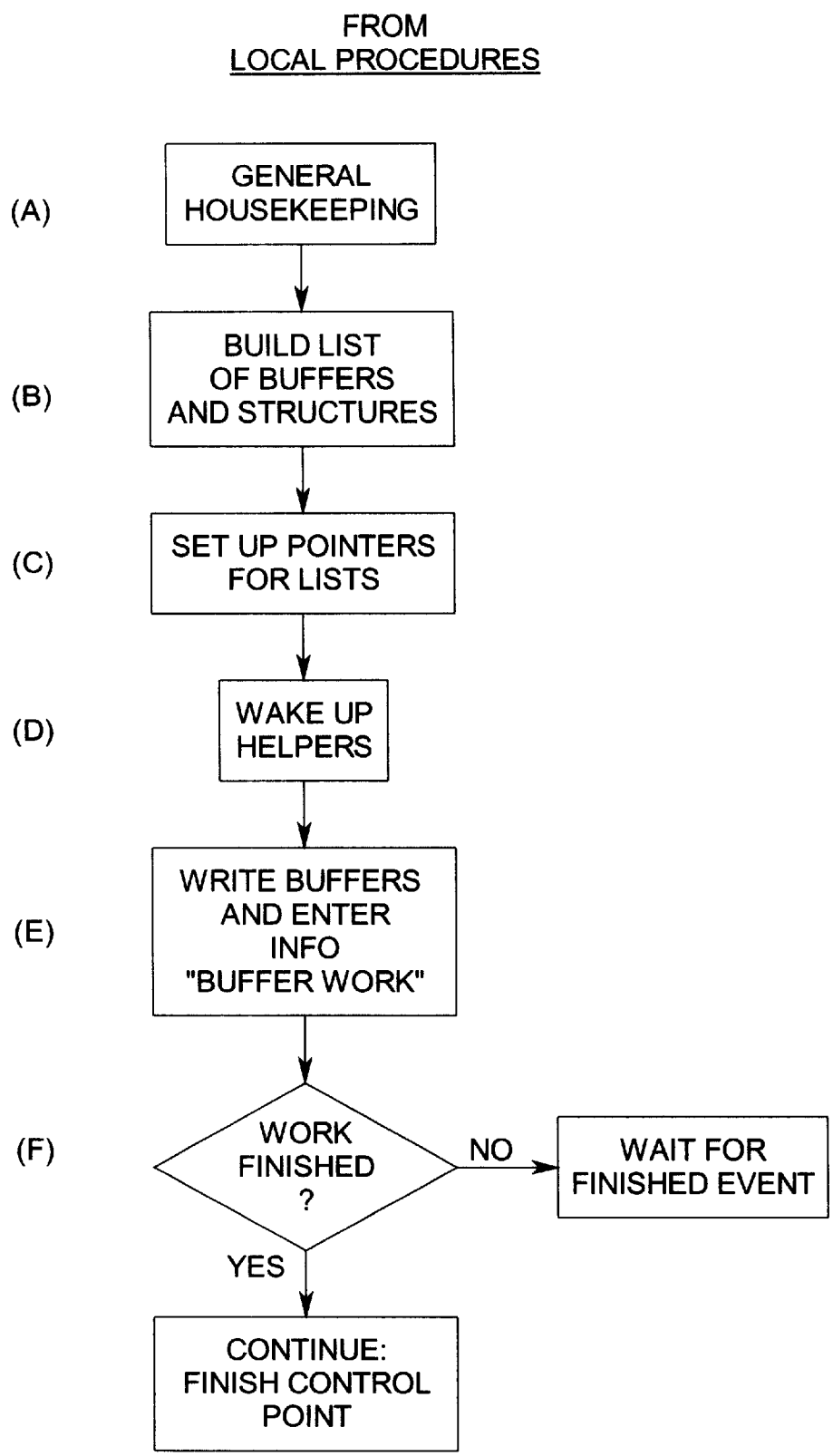
FIG. 4A is a flow chart indicating a generalized version of the steps required to allow for the concurrent set of operations of writing buffers and entering them into the structured data files.

Referring to FIG. 4A, there is seen a set of steps which are called from the "from local procedures" which refers to the user application program steps just prior to entering into the database engine steps that are used in order to flush the buffers; which means that the data of the buffer has now been written to a disk file. This may only involve copying the data from the buffer into the disk file and leaving the data still residing and accessible in the buffer. Thus, the space occupied in the buffer by whatever has been flushed, may or may not become available for other uses. Thus, in step A, the first operation involves the general housekeeping duties and tasks such as setting the process control variables to their initial states in preparation for writing the buffers.

Then at step B, the system will build a list of buffers and structures involved. The various internal substeps of this operation are later shown in FIG. 4B. At step C, the system will set-up pointers for the list.

At step D, the system will wake-up the "helpers", which are the other user application programs that are waiting in database code for the control point to complete in order that they may resume their own work.

At step E, the system will enter into procedures that write the buffers and update specialized information that is used to maintain the physical integrity of the data (this is known as storage control information).

At step F, a decision block is operated to check whether the work has been finished. If the answer is "NO", then the system must wait for the finished event. If the answer is "YES," then the system will continue to finish the CONTROLPOINT which is performed when the last process leaves the transaction state.

Figure 4B:
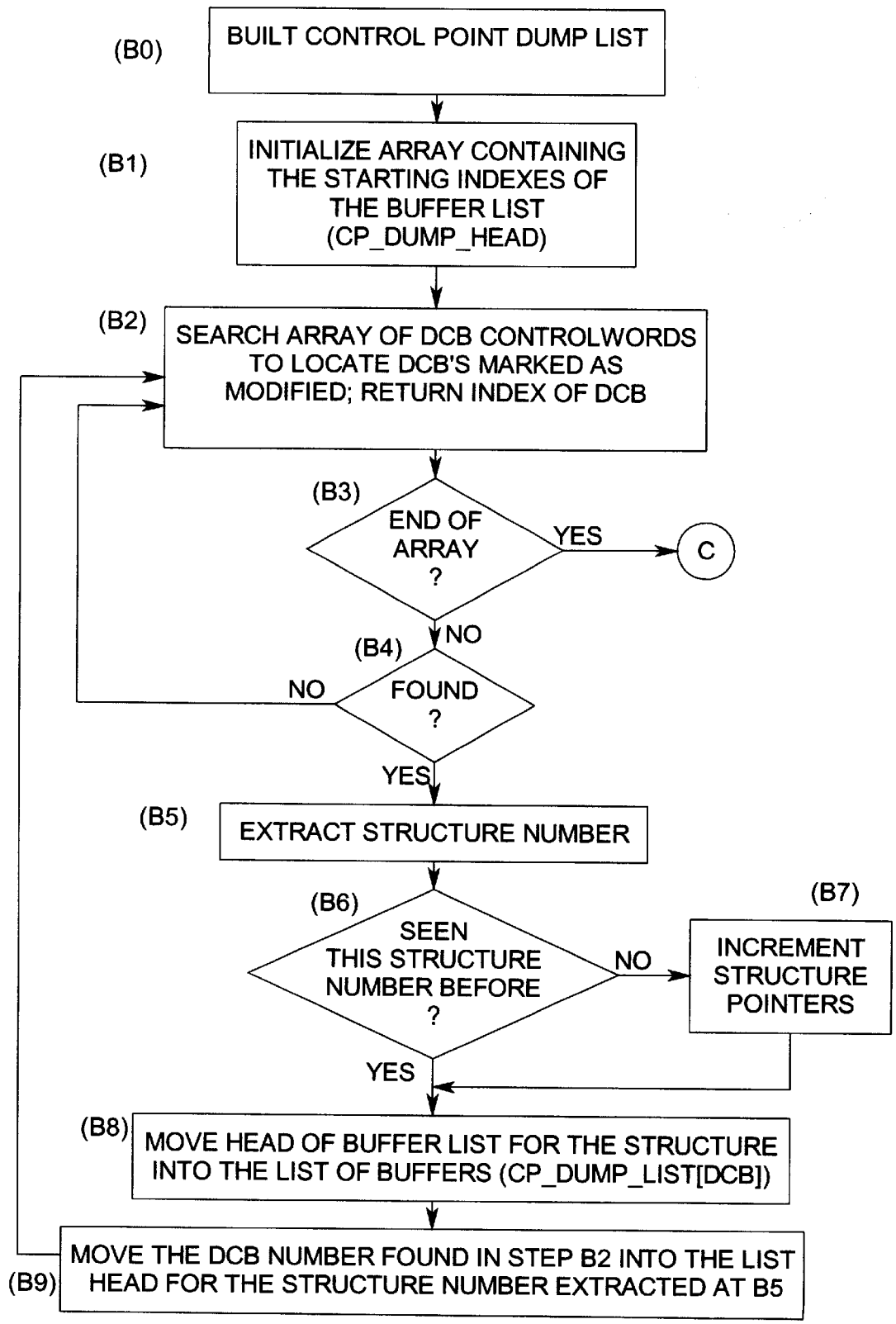
FIG. 4B is a flow chart illustrating the subset of step operations which constitute step B of FIG. 4A.

Referring to FIG. 4B1, which is a more detailed set of steps of section B, which involves building a list of buffers and structures. Thus, in FIG. 4B1, the first step involves step Bo, which involves building a CONTROLPOINTDUMP list.

Then at step Bi, the system will initialize an array containing the starting indexes of the buffer list (CP_DUMP_HEAD).

At step B2, the system will search the array of DCB control words (FIG. 3) to locate the DCB's marked as having been modified; then return the indexes of the DCBs.

At step B3, a decision point is reached to ask whether this is the end of the array. If the answer is "YES", the system will exit. If the answer is "NO", then the system goes to step B4 to see if any other DCB's have been found, after which the system returns back to step B2.

At step B4, if another modified DCB has been found, then at step B5, the system will extract the structure number. Then at step B6, the system will query whether this structure has been seen before. If the answer is "NO", then the system will increment the structure pointers. However, if the structure number has been seen before "YES", then the procedure will go onto step B8 of FIG. 4B2.

It should be noted that the storage disks or database files of FIG. 1 (31, 32, 33) constitute a set of data structures which may be a series of files which follow a sequence of 1, 2, 3, . . . , N. Each of the structures shown in FIG. 1, such as 31a, b, and 32a, b, etc., can be considered as a "logical file." However, each of these logical files will consist of physical files which may be considered as files 1, 2, 3, . . . N physical files.

Figure 4C:
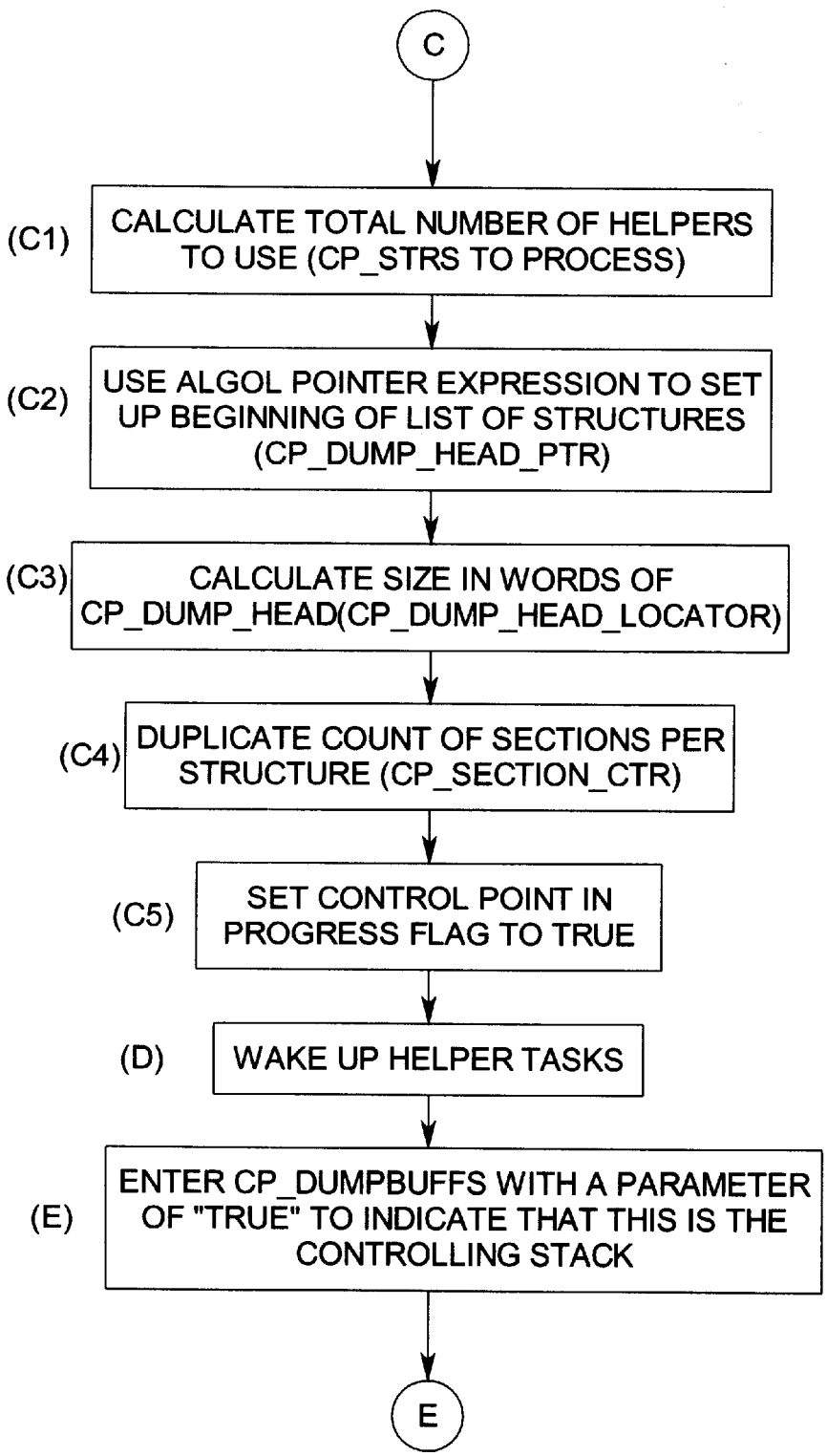
FIG. 4C is a flow chart showing detailed steps of step C of FIG. 4A.

As will be described later in FIGS. 4D, 4E, "step zero" is designated as a sequence of operations where there is a writing to the buffers for all the structures or sections involved. Then step 1, FIG. 4F, is a set of operations where there is a checkout for successful I/O completion for all the structures and sections, that is to say, to see that the buffers were copied into the appropriate file structures.

Figure 4D:
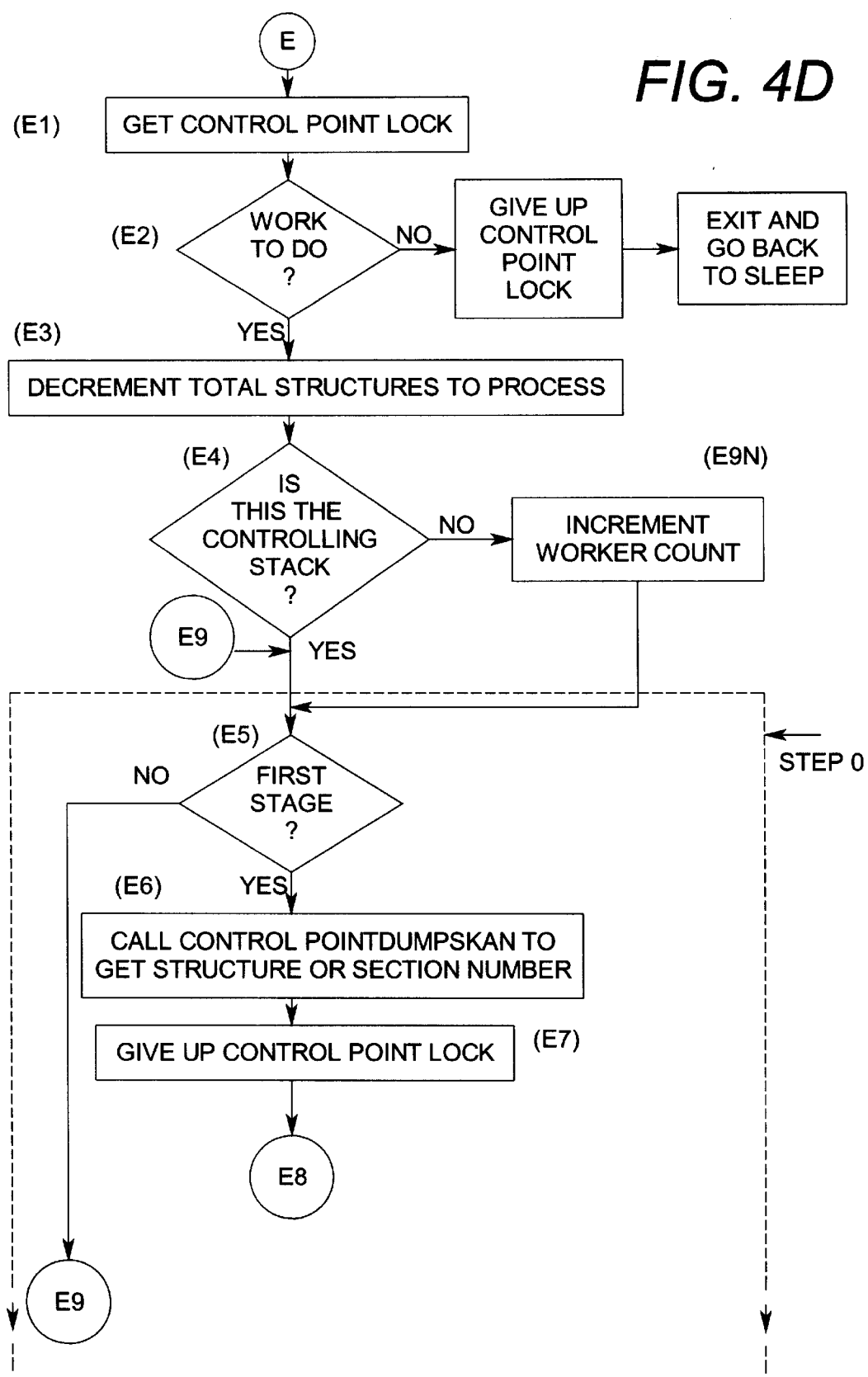
FIG. 4D is a flow chart which continues step E of FIG. 4C.
Figure 4E:
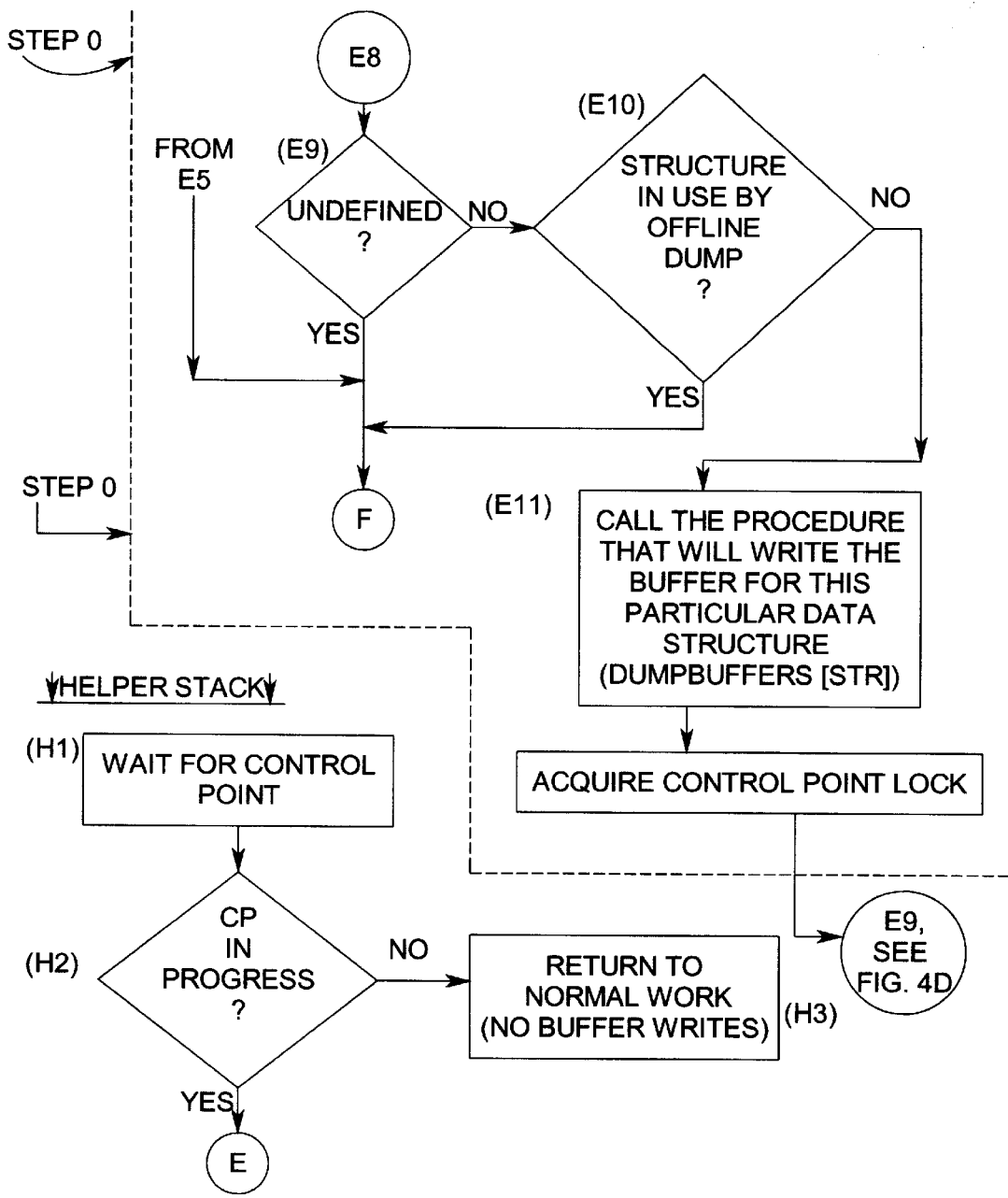
FIG. 4E is a flow chart which continues step E of FIG. 4D and also shows the Helper Stack.
Figure 4F:
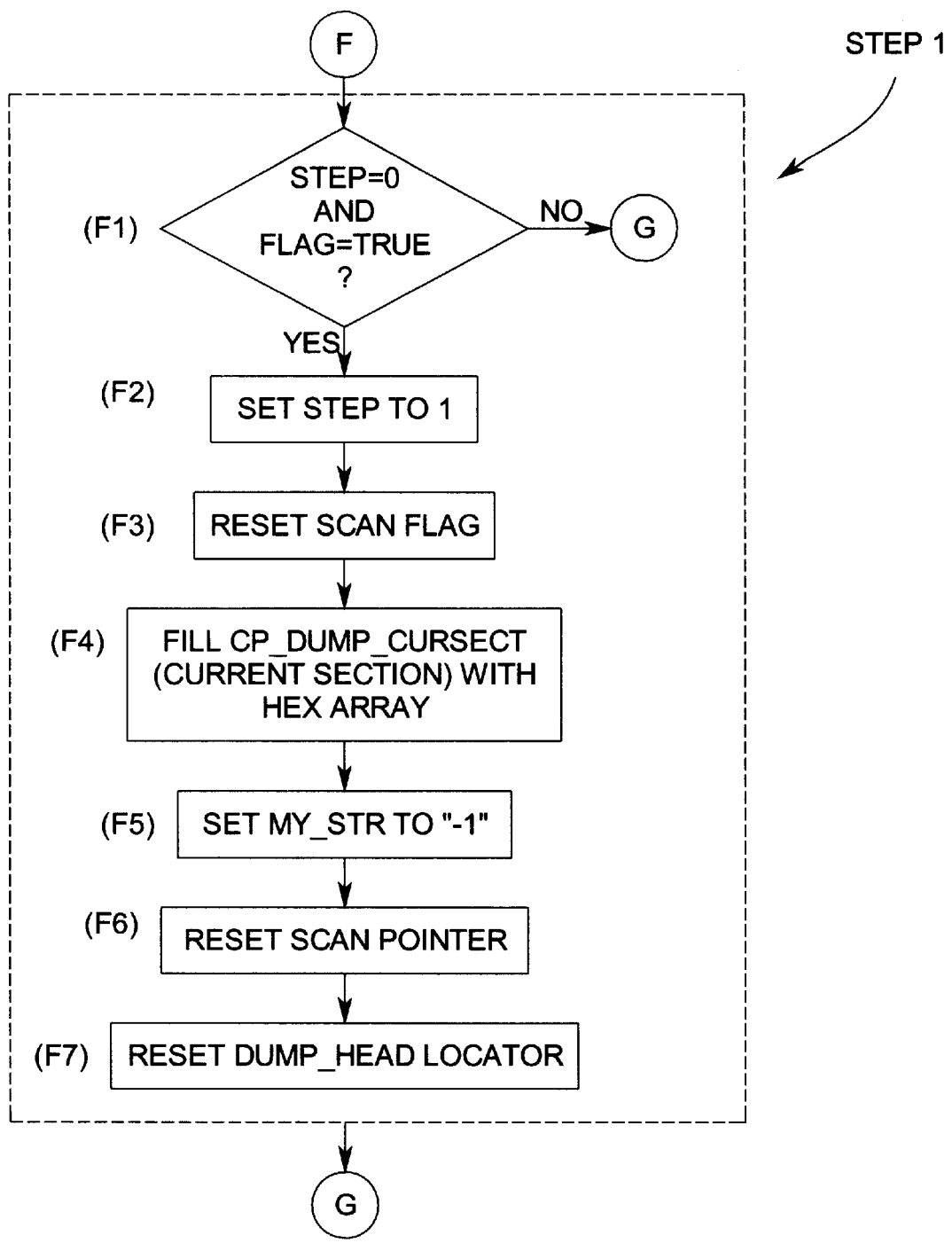
FIG. 4F is a flow chart showing step F of FIG. 4E.

It should be noted that there is a parallel operation here in that step zero, (0) FIGS. 4D, 4E there are many write operations going to different buffers and operating in parallel. Likewise, in step 1, FIG. 4F, there is a multiple set of operations to check for successful I/O completion all operating in parallel.

Figure 4G:
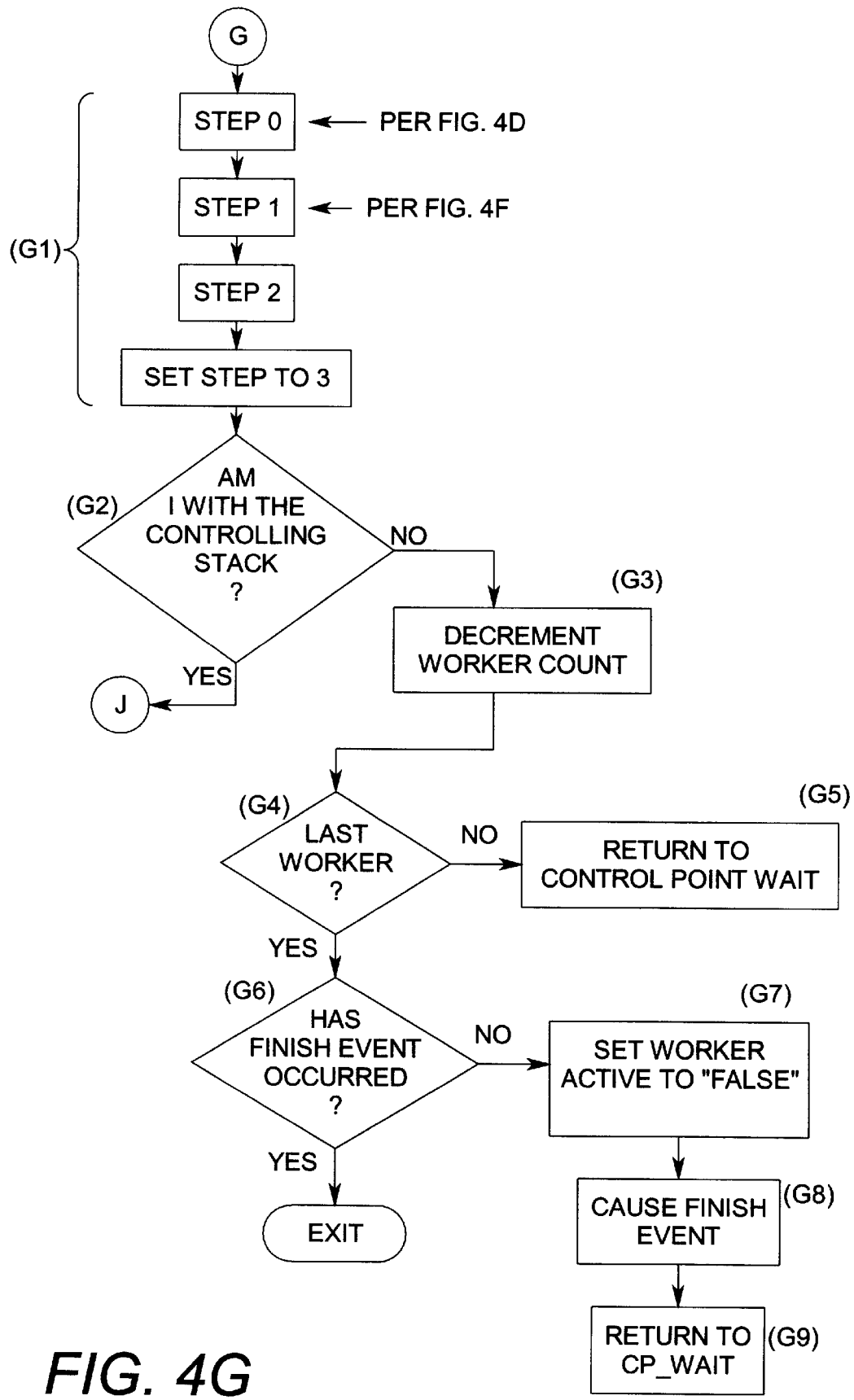
FIG. 4G is a sketch showing the four step sequences of FIGS. 4D, 4E, 4F which then operates to finish the Stack Control.

Then step 2, FIG. 4G, is the performance of the storage control Writes for all of the structures. These also occur as a multiple set of asynchronous operations.

Thus, step "zero" (0) and "one", (1) involves user data while step 2 involves the storage control information used to manage the user data.

Returning to FIG. 4B2, step B8 involves moving the head of the buffer list for the structure into the list of buffers, involving the procedure CP_DUMP_LIST [DCB]. After this at step B9, the sequence will move the DCB number found in step B2 into the list head for the structure number extracted at step B5. After this the B10 sequence will progress back to step B2.

Temporarily referring to FIG. 4B1, there is seen the step B3 which has the "yes" leg pointing outward to C. Now FIG. 4C will indicate the sequence of steps involved in the overall step C operations.

At step C1 the program will calculate the total number of helpers to use (this sequence is designated CP_STRSTOPROCESS).

After this then step C2 will use the ALGOL pointer expression to set up the beginning of the list of structures. This Pointer is designated CP_DUMP_HEAD_PTR.

Then at step C3 the program will calculate the size in words of the CP_DUMP_HEAD (designated as CP_DUMP_HEAD_LOCATOR).

In step C4 there will be provided a duplicate count of the sections per each structure; this sequence is designated CP_SECTION_CTR. By using a duplicate the original values can be preserved while the duplicate is consumed by this process.

At step C5 the program will set the control point in progress flag to "true."

Then upon completion of step C5 the program will progress to step D, which involves the waking up of the helper tasks.

This progresses to step E where there is an entering of the procedure CP_DUMP_BUFFS with a parameter of "true" to indicate that this system is in the controller stack. The helper tasks enter with a value of "false".

Then the sequence of E continues by reference to FIG. 4D. Now referring to FIG. 4D, which shows the steps of the E sequence. Here at step El the program will get the control point lock (CPT_LOCK), after which at step E2 there is a decision block inquiring if there is work to be done by testing whether CP_STRSTOPROCESS is greater than zero. If the answer is "no" then the procedure relinquishes the control point lock, exits, and resumes its previous state of waiting for the control point activities to complete.

At step E2 if the work to be done decision signifies "yes" then step E3 will occur where there is a decrementation of the total structures to be processed. The combination of steps E2 and E3 limits the number of workers to the number of files that must be written to: this reduces contention for the software lock CPT_LOCK. At step E4 another decision block inquires as to whether the stack is the controlling stack. If the answer is "no" then there is an incrementation of the worker count (step E9). The logic sequence then proceeds to step ES, which is designated as "step zero".

At step E4, if the answer is "yes", then this is the controlling stack and the worker count (step E9) is not incremented. Next, a sequence of operations will occur which is designated as "step zero."

This step zero will be seen to encompass steps ES, E6, E7, and E8 thru E11.

Thus at step ES, a query is done to see whether this is step zero, and if the answer is "yes" then at step E6 there is executed a procedure called CONTROLPOINTDUMP-SCAN resulting in the acquisition of either the structure number or the combination of the structure and section numbers. After this at step E7 there is the giving up of the control point lock which leads to step E8 which continues on FIG. 4E. Giving up the lock allows other stacks traversing this area of code to obtain their own unique value of structure or structure and section numbers by calling CONTROLPOINTDUMPSKAN.

In FIG. 4E there is shown a continuation of step zero where step E8 leads to the decision block E9 designated "undefined." This is where the information returned from CONTROLPOINTDUNPSKAN is examined and determined to be either valid structure information or a value ("UNDEFINED") that signifies that the list of structures has been exhausted.

If the answer is "no" then the procedure goes to step E10 which is another decision block inquiring whether the structure is in use by the offline dump (software for backing up database structures). If the answer here is "no" then at step E11, there will be a calling of the procedure that will write the buffer for this particular data structure. The procedure is designated DUMPBUFFERS [STR]. Upon completion of DUMPBUFFERS, the CPT_LOCK is reacquired and the task returns to step E5 (FIG. 4D). Returning to step E9 on the "yes" leg, it is seen that the next sequence of steps is defined by the step F which is shown subsequently in FIG. 4F.

Returning to FIG. 4E, there is seen an indication of the helper stack. The helper stack relates to participation in step E but first starting at step H1 there is a waiting for the control point to occur during and after which at step H2 a decision block occurs as to whether the control point is still in progress. If the answer is "no" then step H3 will return the system back to its normal work routines either without any need for buffer writes or after they have been completed.

If step H2 is answered in the affirmative "yes", then the sequence continues on to step E which was shown in FIG. 4D.

Now referring to FIG. 4F there is seen a flow chart of the step 1 operation where at step F1 there is a decision block to query whether or not this is still step zero (this limits the execution of steps F1 thru F7 to being performed once by a single task) and whether the flag is "true." If the answer here is "yes" then at step F2 the next procedure step number is set to number 1. After this at step F3, there is a resetting of the scan flag. And subsequently at step F4 the procedure fills the array CP_DUMP_CURSECT (Current Section) with the value of hexadecimal F (all bits on) to indicate that the array cells are in their initialized state. At step F5 the procedure is to set to minus one (-1) the value of MY_STR.

At step F6 there is a resetting of the scan pointer and at step F7 there is a resetting DUMP_HEADLOCATOR. The above operations are performed in preparation to entering into the next phase. From this the procedure goes to step G which is seen in FIG. 4G.

Referring back to step F1, if the answer is "no" then steps just described for the "yes", branch have been completed (they must execute once and only once for any given control point) and the procedure goes to step G which is seen in FIG. 4G.

Referring to FIG. 4G the bracket G1 is placed to indicate how a series of steps are done in sequence such as step zero, step 1, step 2, and then the setting made to step 3. The logic is essentially the same as already described for FIGS. 4D, 4E, and 4F. The difference lies in the parameters passed to DUMPBUFFERS at E11. There are three types of calls into DUMPBUFFERS: the first will cause the data buffers to be written, the second will cause the I/O completion activities to occur, and the third causes the Storage Control information to be written. From the setting of CP_STEP to 3 the next sequence item is designated as G2 which is a decision block to query "am I with the controlling stack?" If the answer is "yes" then the program proceeds to step J which is seen in FIG. H.

At step G2 if the answer is "no" then the sequence proceeds to step G3 which involves decrementing the worker count after which there is decision block G4 to question whether this is the last worker. If the answer is "yes" then at step G6 another decision block inquires ----- has a finish event occurred? --- and if this is the case "yes", the program will exit and return to waiting (the same as for G5 described below) for the controlling stack to finish the remainder of the Control Point activities. Now returning back to step G4 querying whether this is the last worker, if the answer is "no" then the sequence proceeds to step G5 which is a return to its state of waiting for all of the control point activities to finish.

Then returning to step G6 on the decision as to whether the finish event has occurred, if the answer is "no" then at step G7 the program will set the worker active flag to "false." After this at step G8, there will be caused the finish event and at step G9 there is a return to Control Point waiting as just described. For all intents and purposes these are returns to H1 on FIG. 4E.

Figure 4H:
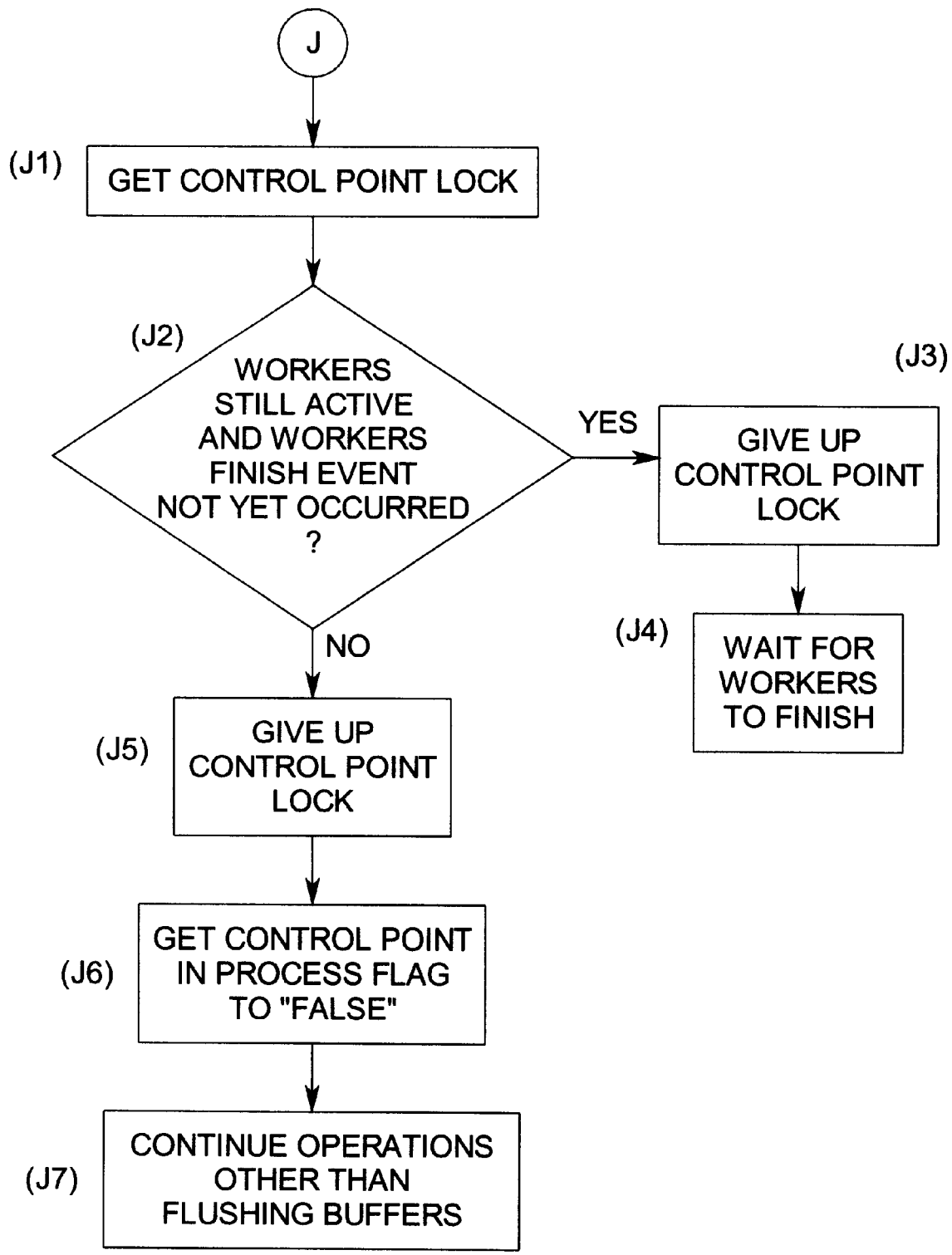
FIG. 4H is a flow chart showing step J from FIG. 4G.

Referring to FIG. 4H there is seen the J sequence which derives from step G2 in FIG. 4G.

Now that J sequence in FIG. 4H starts at step J1 where the system will get a control point lock (CP_LOCK). After this at step J2 there is a decision block with the inquiry if the workers are still active and whether or not the workers finished event has not yet occurred.

If the answer to step J2 is "yes" then at step J3 the system will give up the control point lock and at step J4 it will wait for the workers to finish.

Returning to step J2 if the answer is "no" then at step J5 the system will give up the control point lock and at step J6 it will set the control point in progress flag to "false."

Then at step J7 the controlling stack will continue on to finish the remainder of the Control Point work and, just prior to finishing will awaken the tasks that had gone back to waiting after helping with the buffer flushing. At this point, all tasks are able to proceed with normal ordinary processing operations other than that of flushing the buffers and writing structure control information associated with Control Points.

Now referring to FIG. 4I1, there is seen the procedure called "CONTROLPOINTDUMPSCAN". This procedure comes from and is referenced to the step E6 of FIG. 4D and illustrates the step procedures involved obtaining structure and section numbers from the previously built lists.

In FIG. 4I1, starting at step K1, there is seen a decision block which has the query of CP_DUMP_HEAD_LOCATOR as to whether this is greater than zero. This tests whether there are entries remaining in the list. If the answer is "YES", then the sequence proceeds to step K-2 which is another decision block which inquires whether the structure number is greater than zero. If the answer is "YES", then this is not the very first scan and the procedure goes to step K-3 to another decision block which has the query of CP_DUMP_CURSECT, which involves seeking to know whether this structure is one that is sectioned (made up of multiple physical files).

If the answer at K3 is yes, then the sequence proceeds to K4 in order to increment the local value of the section number for this structure, this variable being designated CP_MYSECT.

The next step is step K6 which involves a decision block to inquire whether CP_MYSECT is less than the maximum for this structure. If the answer here is "YES", then the sequence proceeds to step K7 where it will save the section number for use by the next worker when it reaches step K3. This involves the array designated CP_DUMP_CURSECT which is indexed by the structure number.

After this at step K8, the program will exit and return the value of the structure number and the section number, and then return to step E6 of FIG. 4D.

The present sequence of events involved a series of "YES", starting from step E6 in order to arrive back to the finality of E6. However, it is necessary to look at the other choice involving "NO".

At step K1, if the answer is "NO", then the sequence proceeds to exit and return the value of "undefined" at step K12, which then returns to step E6 at FIG. 4D.

At step K1, if the answer is "NO", then the sequence proceeds to step K9 where there is a scan for structures with buffers to write. This then proceeds to step K10 which is a decision block to question whether the list of structures have been exhausted or not. If the answer is "NO", then the sequence proceeds to step $K_C$ on FIG. 4I2.

At step K10, if the answer is "YES", that is to say the list of structures are exhausted, then at step K11 there is a setting of the scan flag to "TRUE", after which there is an exit and return value of "undefined" at step K12, which then returns to step E6 at FIG. 4D.

Now returning to step K6 of FIG. 4I1, where the decision block has a "NO" response, then the sequence proceeds to step K13 in order to advance to the next cell of the pointer associated with CP_DUMP_HEAD so that the next scan operation will proceed to the next structure. After this at step K14, the sequence will convert the scanner index to the structure number and get the value of the index into the array designated CP_DUMP_HEAD.

From step K14 to step K15 there appears a decision block to query said index at to whether the list is exhausted. If the answer is "NO", then the sequence returns back to step K9. If the answer at step K15 is "YES" (list exhausted), then the procedure goes to step K16 to set the scan flag to "TRUE".

Now, referring to FIG. 4I2, which continues from the step $K_C$ from FIG. 4I1.

At FIG. 4I2, the first step is designated $K_{C1}$ which involves converting the scanner index to the structure number. This then proceeds to step $K_{C2}$ which involves a decision block as to whether the structure is sectioned or not. If this is a "YES", then at step $K_{C3}$ the procedure will take the initialized section number and set it to zero, after which at step $K_{C4}$ there will be a return of the structure number and the section number during which the sequence proceeds to step E6 of FIG. 4D.

Returning to step $K_{C2}$ of FIG. 4I2, there is the query of whether this structure is sectioned or not? Here, if the answer is "NO", the sequence proceeds to step $K_{C5}$ to advance the CP_DUMP_HEAD pointer. After step $K_{C5}$, the next step $K_{C6}$ is a decision block to query whether the structure list is exhausted or not. If the answer is "NO", then at step $K_{C8}$ there will be a return of the structure number to step E6. However, if the answer is "YES", then the procedure goes to step $K_{C7}$ and will set the scan flag to "TRUE".

In the earlier version of the Unisys DMS II system, the CP_SOC_BUFF array was a shared buffer used to handle storage control points by a procedure designated STORAGEOPENCLOSE during the CONTROLPOINTS. In the earlier implementation, this was declared at the D2 level. The designation D2, D3 . . . D8 level involves a lexical level, or lex level, which involves a number that indicates the relative level of an addressing space within the stack of an executing program. Here, (i) The lexical levels range from "0" through either 15 or up to 31 depending on the type of computer family. A "lower" lexical level indicates a more global addressing space. (ii) It is also a measure of the number of other blocks that a given block is nested within. The outer block of a program has a lex level of 2 or 3, depending on whether the program has a procedure heading. Each block has a lex level which is one higher than the block it is nested within.

The present system rather now declares an array in what is called the COMMONDBS in order that a private CP_SOC_BUFF exists for each individual structure or section (no need for buffer sharing). This allows concurrent Input/Output (I/O) activity for multiple structures and sections, during the time of performing storage control updates during a CONTROLPOINT. In the earlier operational system of the Unisys DMSII, the CONTROLPOINT-DUMP procedure consisted of three modules, each of which was controlled by bits located in the parameter passed in when it was called (the OP word). This procedure was called twice when executing a "CONTROLPOINT". The first call here resulted in executing modules one and two, while the second call executed modules two and three. Modules two and three then call ALL_DUMPBUFFERS, a total of three times: once to initiate the I/O's, once to wait for the I/O completions, and once to clean-up any remaining storage control information.

Now, quite contrarily, the new system and method divides this into three separate procedures, the first one, BUILDCONTROLPTDUMPLIST, and this is only executed by the controlling stack, that is to say, the last one out of the transaction state. This builds the list of structures having buffers that must be flushed during this particular control point. In addition, the first procedure counts the number of structures and the sections that will be involved in this particular CONTROLPOINT.

A "section count" is obtained from the array designated CP_DUMP_SECTINFO, which is indexed by structure number, and filled-in for sectioned structures by STROPEN-STRUCTURE of SECTION_SB when the structure is first opened for use. This only applies to data sets since index sequential is the only set type currently allowed to be defined as "XE", and they are actually a single physical file.

The second procedure, designated CONTROLPTDUMPSCAN, is called by all CONTROLPOINT participants in order to obtain the next available structure, and where appropriate, section numbers from the list that was built in the previous step. Logically, this occurs twice, once to write the buffers, and once to wait for the I/O completions. In actual practice, each of these activities occurs as many times as there are structures and sections to process.

Once the structure number (and the section number) is obtained, then the procedure ALL_DUMPBUFFERS can be called. The outer block DUMPBUFFERS for sectioned structures (data sets) will call specific sections when a CONTROLPOINT is in progress.

Actual test results have indicated that this configuration of the new method resulted in considerably better performance than having each caller issue a task and then have to wait for its own I/O completions.

The final step involved is to perform the storage control I/O's on the remaining structures and sections. The requisite structure/section information is then obtained by calling the program CPGETALLSTRNUMS.

The initial housekeeping (step A of FIG. 4A) and control of the list building occurs in the procedure AUDITCONTROLPOINT. The actual CONTROLPOINT work as described above, is coordinated with a new procedure designated: CP_DUMPBUFFS. It's various stages are coordinated by CP_SETP; in turn, each stage signals its completion by returning the value UNDEFINED, rather than a structure-number/section-number pair.

The controlling stack enters CP_DUMPBUFFS with a parameter value of TRUE, and all helper stacks enter with FALSE. The parameter, called CTLSTACK, is used upon entry and exit to control information associated only with the helper stacks.

The procedure involves a new lock, CPT_LOCK, which coordinates access to the structure and section numbers. Further, in order to minimize contention, the number of stacks allowed to participate is limited to the number of structures and sections (CP_STRSTOPROCESS and CP_TOTAL_SECTS) which is obtained from the BUILD-CONTROLPOINTDUMPLIST.

The "helper stacks" are awakened by executing a DMSCAUSE ("0"). Now, given that CPINPROGRESS is TRUE, then the helper stacks enter CP_DUMPBUFFS which then follows the steps described above. After the helper stacks exit, they go back to sleep and wait for the CONTROLPOINT to complete in the standard procedural fashion.

Described herein is an asynchronous mechanism which distributes the workload of flushing data buffers of the file structures by operating concurrently over a number of processes. A singular advantage is one of taking and using user tasks which are already running on a single or multiple processor computer system. Thus, the time required to accomplish the task of writing buffers and then flushing or copying them to structure data files is minimized in basically two ways.

Initially, all of the Write operations are initiated which means there is an exceedingly high probability that the first started Write operations will have finished even before the last set of Write operations have been initiated. Likewise, there is a series of tests in order to determine the correct completion of the operations as having been copied from buffers to the final repository locations in the structured files. Thus, likewise in a parallel sequential manner the I/O completions are handled similar to the sequence of initiations done by the Write operation. This reduces the probability of any necessity to wait for some operation to complete.

As a second advantage, the workload is spread across the active update users of the system, so this permits a multi-processor system to take advantage of the ability to perform multiple tasks simultaneously. Another advantage of the present system is that the use of existing application tasks does not burden the system with the overhead of initiation and management of specialized tasks. Thus, the present system enables full advantage of the parallelism of operations inherent in multi-processor computer systems.

While the preferred embodiment of the system has been described in specific detail, the invention may also be implemented in other similar ways and should be considered to be defined by the attached claims.

What is claimed is:

1. In a multi-processor system for reading and writing data buffers from and to a storage medium whereby multiple processors and multiple user programs utilize a common memory working in conjunction with a master control program and database engines for availability to each processor, a system for providing concurrent operations which flush multiple buffers which are being operated upon from concurrently operating user programs which participate in buffer I/O activity, said system comprising:

(a) multiple processor means connected to a commonly shared memory means, said processor means utilizing a stack architecture permitting an accessroutines program to run on top of each user application;

(b) master control program means providing multiple user application programs which include:

(b1) a plurality of database engines for providing multiple access routines to modified buffers in a buffer pool enabling parallel concurrent tasks from said user application programs to function concurrently;

(b2) buffer pool means having multiple buffers for holding modified data to be copied to a plurality of database file structures;

(c) storage structure means including database files which communicate with said data buffer pool and said database engine.

2. The system of claim 1 which includes:

(d) said commonly shared memory means providing multiple access paths connecting each one of said multiple processors means to each one of said plurality of database engines;

(e) said buffer pool means providing multiple buffer units for each database file structure.

3. The multiple processor system of claim 1 wherein said multiple access routines of said database engine include:

(b1a) means for building a list of buffer units and file structures;

(b1b) means for setting a series of address pointers for said list of buffers units and structures;

(b1c) means for writing modified buffer data from said buffer units into the database file structures on a concurrent basis working in parallel until all write operations to the appropriate database file structures are completed.

4. The system of claim 1 wherein said database engine includes:

(i) means to concurrently build a list of buffer units and file structures;

(ii) means to organize said buffer units for flushing tasks in logical groups so that each logical group can be processed in a single transaction;

(iii) means for setting a series of address pointers for pointing to said list of buffer units and structures;

(iv) means for writing the modified data from said buffers into said database file structures in a parallel fashion concurrently until all the buffer unit transfer tasks have been exhausted and written to said database file structures.

5. In a multi-processor system for reading and writing data buffers to modular units of a storage medium means wherein multiple processors work with multiple user application program means utilizing a common memory for communication with a master control program which provides multiple database engines available to each and any of the multiple processors, a system for concurrently flushing multiple buffers operated upon from concurrently operating user programs and concurrently operating processors for writing modified buffer data to selected database file structures, said system comprising:

(a) multiple processor means having user application programs linked with buffer access routine programs and connected to a commonly shared memory means;

(b) said commonly shared memory means providing multiple access paths connecting each or any of said multiple processors to each of the modular units of said storage medium means;

(c) master control program means providing multiple user application programs which include:

(c1) a database engine for providing said multiple access routines to modified buffers in a buffer pool means;

(c2) buffer pool means having multiple buffers for some of which are selected holding modified data to be copied to a series of database file structures;

(d) said storage medium means including database file structures which communicate with said data buffer pool and said database engine.

6. The system of claim 5 wherein said buffer pool means includes:

(c2a) a plurality of buffer units, wherein each said buffer unit is addressably linked with a particular database file structure.

7. The system of claim 5 wherein said Master Control Program means includes:

(c3) means for distributing and controlling the workload of the system, including that of buffer flushing, over a number of different process operations including that of Read operations for supplying data to a requesting user application.

8. The system of claim 6 wherein said multiple user application program means includes:

(c4) means to logically group the flushing of buffers and updating the database file structures so as to orient each group according to the specific file structure involved with a specific modular unit of said storage medium means thus enabling each logical group to be processed in a single transaction.

9. The system of claim 8 wherein said multiple user application programs means includes:

(c5) means to verify the completion of each buffer unit flushed to its particular database file structure.

10. The system of claim 6 wherein said multiple user application program means includes:

(i) means to flush various logical groups of buffer units in parallel to selected file structures in said database file structure;

(ii) means to verify the completion of each flushing of the buffers to each logical group database file structure in parallel concurrently with the verification of the flushing of buffers to their other logical database file structures.

* * * * *